United States Patent
Ohgata et al.

(10) Patent No.: US 11,149,843 B2
(45) Date of Patent: Oct. 19, 2021

(54) VEHICLE POWER TRANSMISSION DEVICE

(71) Applicants: Toyota Jidosha Kabushiki Kaisha, Toyota (JP); Aisin AW Co., Ltd., Anjo (JP)

(72) Inventors: Yusuke Ohgata, Miyoshi (JP); Shuji Moriyama, Nagakute (JP); Daisuke Tomomatsu, Nisshin (JP); Makoto Sawada, Nisshin (JP); Kyohei Suzumura, Nagoya (JP); Kenichi Tsuchida, Anjo (JP); Koji Makino, Anjo (JP); Toshiaki Hayashi, Anjo (JP); Yuta Seriguchi, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 700 days.

(21) Appl. No.: 15/983,661

(22) Filed: May 18, 2018

(65) Prior Publication Data
US 2018/0335134 A1     Nov. 22, 2018

(30) Foreign Application Priority Data

May 19, 2017   (JP) .............................. JP2017-099889

(51) Int. Cl.
*F16H 61/12*   (2010.01)
*F16H 61/662*   (2006.01)
*F16H 61/02*   (2006.01)

(52) U.S. Cl.
CPC ......... *F16H 61/12* (2013.01); *F16H 61/0267* (2013.01); *F16H 61/0276* (2013.01);
(Continued)

(58) Field of Classification Search
None
See application file for complete search history.

(56) References Cited

U.S. PATENT DOCUMENTS

| 5,188,007 A * | 2/1993 | Hattori | F16H 61/66272 474/1 |
| 7,993,225 B2 * | 8/2011 | Ogata | F16H 61/66259 474/28 |

(Continued)

FOREIGN PATENT DOCUMENTS

| CN | 101749413 A | 6/2010 |
| JP | 2010-144796 | 7/2010 |

(Continued)

OTHER PUBLICATIONS

JP2017099889 Notice of Reasons for Refusal—translated (Year: 2020).*
Written Opinion JP 2017099889 (Year: 2021).*

*Primary Examiner* — Dirk Wright
(74) *Attorney, Agent, or Firm* — Oblon, McClelland, Maier & Neustadt, L.L.P.

(57) ABSTRACT

A vehicle power transmission device includes: a continuously variable transmission including a primary pulley, a secondary pulley, and a transmission belt wound between the primary pulley and the secondary pulley; a belt running clutch of hydraulic type for transmitting power to the continuously variable transmission; and a hydraulic control circuit controlling the continuously variable transmission and the belt running clutch. The hydraulic control circuit includes a fail-safe valve switching a communication destination of an oil supply passage for supplying a hydraulic fluid to the belt running clutch to one of a first oil passage supplied with a control hydraulic pressure and a second oil passage supplied with a hydraulic pressure higher than the control hydraulic pressure, the fail-safe valve connecting the oil supply passage with the second oil passage when the fail-safe valve is switched to a failure position. The second oil passage is provided with an orifice.

6 Claims, 11 Drawing Sheets

(52) U.S. Cl.
CPC .......... *F16H 61/66272* (2013.01); *F16H 2061/0279* (2013.01); *F16H 2061/1252* (2013.01); *F16H 2061/1256* (2013.01); *F16H 2061/1264* (2013.01); *F16H 2061/1288* (2013.01)

(56) References Cited

U.S. PATENT DOCUMENTS

| | | | |
|---|---|---|---|
| 8,287,409 B2* | 10/2012 | Ogata | F16H 61/12 474/18 |
| 10,746,295 B2* | 8/2020 | Washio | F16H 61/66272 |
| 2010/0151977 A1 | 6/2010 | Ogata | |
| 2010/0236887 A1* | 9/2010 | Sakamoto | F16H 61/0206 192/3.3 |
| 2017/0146104 A1 | 5/2017 | Tsuchida et al. | |
| 2018/0202541 A1 | 7/2018 | Tsuchida et al. | |

FOREIGN PATENT DOCUMENTS

| | | |
|---|---|---|
| JP | 2013-137105 A | 7/2013 |
| JP | 2016-102565 A | 6/2016 |
| JP | 2016-169839 | 9/2016 |
| JP | 2017-161056 | 9/2017 |
| WO | WO 2016/013389 A1 | 1/2016 |
| WO | WO 2017/038503 A1 | 3/2017 |

\* cited by examiner

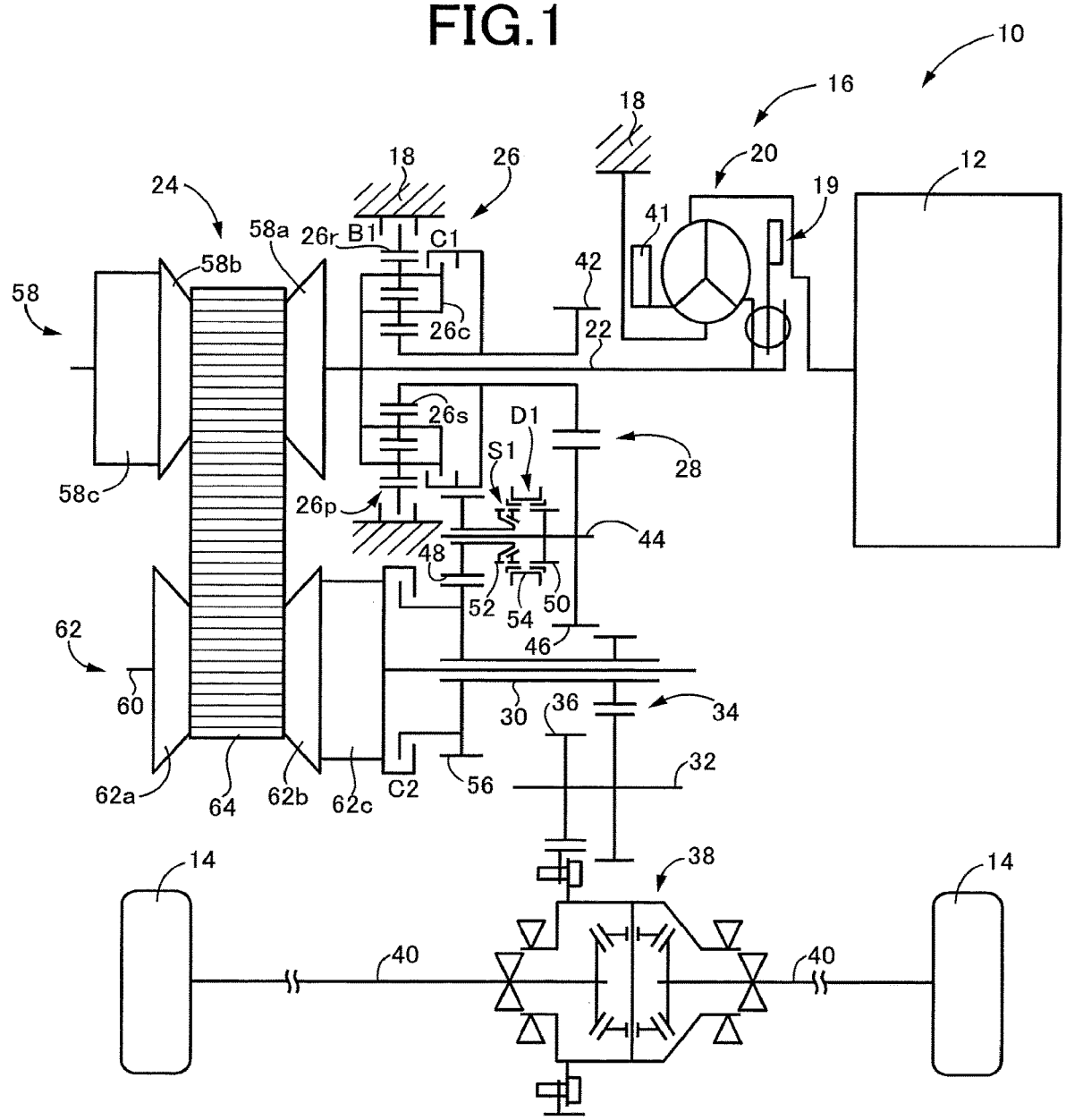

VEHICLE POWER TRANSMISSION DEVICE

This application claims priority from Japanese Patent Application No. 2017-099889 filed on May 19, 2017, the disclosure of which is herein incorporated by reference in its entirety.

TECHNICAL FIELD

The present invention relates to a vehicle power transmission device including a belt-type continuously variable transmission on a power transmission path between an engine and drive wheels.

BACKGROUND ART

A vehicle power transmission device is well known that includes a continuously variable transmission disposed between an engine and drive wheels and configured to include a primary pulley, a secondary pulley, and a transmission belt wound between the primary pulley and the secondary pulley, and a belt running clutch of hydraulic type for transmitting power to the continuously variable transmission. For example, this corresponds to a power transmission device of Patent Document 1. The power transmission device of Patent Document 1 is configured to include a gear running path made up of a gear mechanism through which power is transmitted by engagement of the first clutch and a belt running path made up of a continuously variable transmission through which power is transmitted by engagement of a second clutch (the belt running clutch) parallel to each other. According to the description, a fail-safe valve is included and, for example, if a failure occurs in an electromagnetic valve controlling a hydraulic pressure of a hydraulic fluid supplied to the second clutch, the fail-safe valve interrupts communication between an oil passage connected to the second clutch and an oil passage from which the hydraulic pressure of the electromagnetic valve is output and allows communication between the oil passage connected to the second clutch and an oil passage supplied with a line pressure. Since this fail-safe valve is disposed, even when the electromagnetic valve has a failure, the oil passage is switched by the fail-safe valve and the line pressure is supplied to the second clutch, so that running using the belt running path can be performed.

PRIOR ART DOCUMENTS

Patent Documents

Patent Document 1: Japanese Laid-Open Patent Publication No. 2016-169839
Patent Document 2: Japanese Laid-Open Patent Publication No. 2010-144796

SUMMARY OF THE INVENTION

Problem to Be Solved by the Invention

In Patent Document 1, when the fail-safe valve is operated and the communication is allowed between the oil passage connected to the second clutch and the oil passage supplied with the line pressure, the line pressure is supplied to the second clutch, so that the second clutch may suddenly be engaged before a belt clamping pressure of the continuously variable transmission reaches a target value. In this case, a belt slip may occur since the belt clamping pressure is small with respect to the torque transmitted to the continuously variable transmission. Not only in the configuration in which the continuously variable transmission and the gear mechanism are arranged parallel to each other as in Patent Document 1, but also in a power transmission device including a continuously variable transmission between an engine and drive wheels and including a fail-safe valve switching a supply destination of a hydraulic pressure of a clutch for transmitting power to the continuously variable transmission, a belt slip may occur since the belt clamping pressure is small with respect to the torque transmitted to the continuously variable transmission when the fail-safe valve is operated and the clutch is suddenly engaged.

The present invention was conceived in view of the situations and it is therefore an object of the present invention to provide a vehicle power transmission device that includes a continuously variable transmission disposed on a power transmission path between an engine and drive wheels, a belt running clutch for transmitting a torque to the continuously variable transmission, and a fail-safe valve switching a supply destination of a hydraulic pressure supplied to the belt running clutch and that is capable of preventing a belt slip occurring when the fail-safe valve is operated.

Solution to Problem

A first aspect of the present invention provides a vehicle power transmission device comprising: a continuously variable transmission configured to include a primary pulley, a secondary pulley, and a transmission belt wound between the primary pulley and the secondary pulley; a belt running clutch of hydraulic type for transmitting power to the continuously variable transmission; and a hydraulic control circuit controlling the continuously variable transmission and the belt running clutch, the hydraulic control circuit comprising a fail-safe valve switching a communication destination of an oil supply passage for supplying a hydraulic fluid to the belt running clutch to one of a first oil passage supplied with a control hydraulic pressure and a second oil passage supplied with a hydraulic pressure higher than the control hydraulic pressure, the fail-safe valve connecting the oil supply passage with the second oil passage when the fail-safe valve is switched to a failure position, wherein the second oil passage is provided with an orifice.

A second aspect of the present invention provides the vehicle power transmission device recited in the first aspect of the invention, wherein the fail-safe valve is switched to the failure-time position when a hydraulic pressure in an oil chamber formed in the fail-safe valve reaches a predetermined value or more, the oil chamber is supplied with a hydraulic pressure output from an electromagnetic valve, and the electromagnetic valve is configured to output a hydraulic pressure when a supply current becomes zero.

A third aspect of the present invention provides the vehicle power transmission device recited in the second aspect of the invention, wherein a hydraulic actuator for adjusting a pulley width of the primary pulley is disposed, and the hydraulic actuator is supplied with an output pressure of the electromagnetic valve or a hydraulic pressure regulated based on the output pressure of the electromagnetic valve.

A fourth aspect of the present invention provides the vehicle power transmission device recited in the second or third aspect of the invention, wherein a secondary-side hydraulic actuator for adjusting a belt clamping pressure generated between the secondary pulley and the transmission belt is disposed, and a hydraulic pressure of the secondary-side hydraulic actuator is increased when it is determined that the electromagnetic valve has a failure.

A fifth aspect of the present invention provides the vehicle power transmission device recited in any one of the first through fourth aspects of the invention, further comprising a gear mechanism arranged parallel with the continuously variable transmission, and a gear running clutch for transmitting power to the gear mechanism.

Advantageous Effects of the Invention

According to the vehicle power transmission device recited in the first aspect of the invention, when the fail-safe valve is switched to the failure-time position, the oil passage for supplying the hydraulic fluid to the belt running clutch communicates with the oil passage supplied with a hydraulic pressure higher than the control hydraulic pressure, and therefore, a relatively high hydraulic pressure is supplied to the belt running clutch. In this case, the belt running clutch may suddenly be engaged and the belt clamping pressure may not be ensured sufficiently so that the belt slip may occur. In this regard, since the orifice is disposed in the oil passage supplied with the high hydraulic pressure, the increase in the hydraulic pressure of the hydraulic fluid supplied to the belt running clutch is delayed. Therefore, the belt clamping pressure preventing the belt slip can be ensured in the engagement transition period of the belt running clutch, and the belt slip can be prevented during the engagement transition period.

According to the vehicle power transmission device of the second aspect of the invention, for example, when the electromagnetic valve is disconnected, no supply current is supplied, and therefore, the hydraulic pressure is output from the electromagnetic valve. In this case, the fail-safe valve is switched to the failure-time position, and a relatively high hydraulic pressure is supplied to the belt running clutch; however, since the orifice is disposed in the oil passage supplied with the relatively high hydraulic pressure, the increase in the hydraulic pressure of the belt running clutch is delayed. Therefore, the belt clamping pressure preventing the belt slip can be ensured in the engagement transition period of the belt running clutch, and the belt slip can be prevented during the engagement transition period.

According to the vehicle power transmission device of the third aspect of the invention, since the output pressure is output when the electromagnetic valve is disconnected, the fail-safe valve is switched to the failure-time position, and therefore, a relatively high hydraulic pressure is supplied to the belt running clutch so that the belt running clutch is engaged. In this case, although a torque is transmitted to the continuously variable transmission and it is required to promptly ensure the belt clamping pressure preventing a belt slip, since the increase in the hydraulic pressure of the belt running clutch is delayed by the orifice, the belt clamping pressure can be ensured in the engagement transition period of the belt running clutch, so that the belt slip during the engagement transition period can be prevented.

According to the vehicle power transmission device of the fourth aspect of the invention, when the disconnection of the electromagnetic valve occurs, a high hydraulic pressure is supplied to the belt running clutch and the belt running clutch is engaged, while the hydraulic pressure of the secondary-side hydraulic actuator is increased, so that the belt clamping pressure is ensured. In this case, since the increase in the hydraulic pressure of the belt running clutch is delayed by the orifice, the belt clamping pressure can be ensured in the engagement transition period of the belt running clutch, so that the belt slip during the engagement transition period can be prevented.

According to the vehicle power transmission device of the fifth aspect of the invention, when the gear running clutch is engaged and the belt running clutch is released, power is transmitted to the gear mechanism and the running using the gear mechanism is enabled. For example, when disconnection of the electromagnetic valve occurs during running using the gear mechanism and the fail-safe valve is switched to the failure-time position so that the belt running clutch is engaged, the running using the continuously variable transmission is enabled. In this case, it is required to ensure the belt clamping pressure so as to prevent the belt slip of the continuously variable transmission; however, since the orifice is disposed in the oil passage supplied with a relatively high hydraulic pressure, the increase in the hydraulic pressure of the belt running clutch is delayed, and therefore, the belt clamping pressure can be ensured in the engagement transition period of the belt running clutch, and the belt slip can be prevented during the engagement transition period.

BRIEF DESCRIPTION OF DRAWINGS

FIG. 1 is a diagram for explaining a schematic configuration of a vehicle to which the present invention is applied.

FIG. 2 is a diagram for explaining switching of running patterns of a power transmission device of FIG. 1 by using an engagement table of engagement elements for each of the running patterns.

MODES FOR CARRYING OUT THE INVENTION

Figure 3:
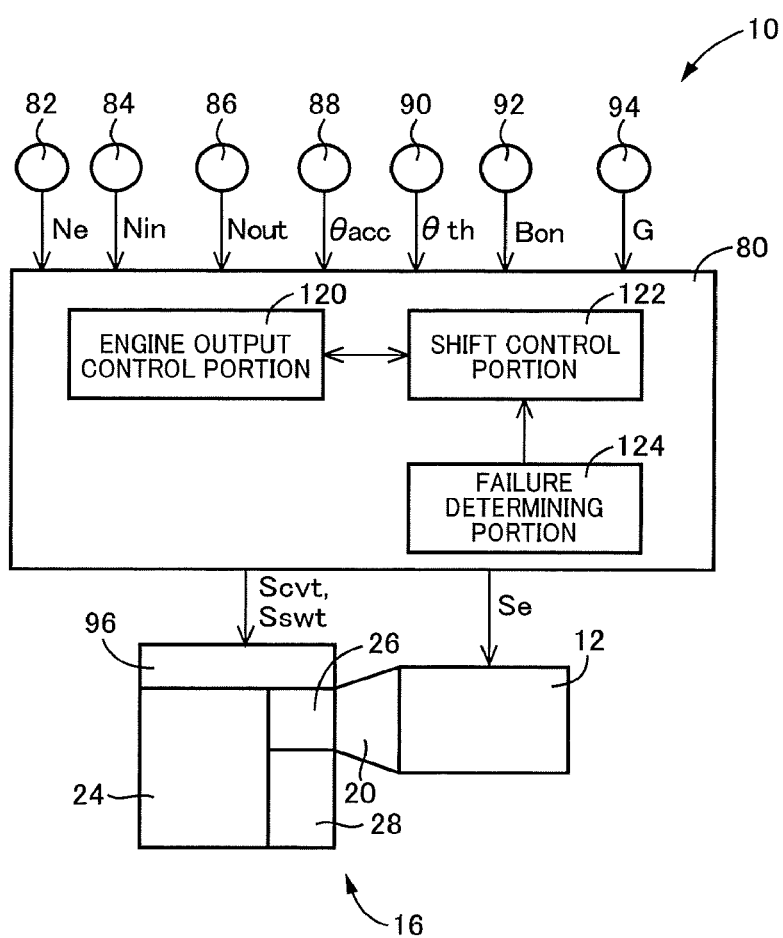
FIG. 3 is a diagram for explaining main portions of a control function and a control system for various controls in the vehicle of FIG. 1.

An example of the present invention will now be described in detail with reference to the drawings. In the following example, the figures are simplified or deformed as needed and portions are not necessarily precisely drawn in terms of dimension ratio, shape, etc.

First Example

FIG. 1 is a diagram for explaining a schematic configuration of a vehicle 10 to which the present invention is applied. In FIG. 1, the vehicle 10 includes an engine 12 functioning as a drive power source for running, drive wheels 14, and a vehicle power transmission device 16 (hereinafter referred to as a power transmission device 16) disposed between the engine 12 and the drive wheels 14. The power transmission device 16 includes, in a housing 18 serving as a non-rotating member, a torque converter 20 with a known lockup clutch 19 as a hydraulic transmission device coupled to the engine 12, an input shaft 22 disposed integrally with a turbine shaft that is an output rotating member of the torque converter 20, a known belt-type continuously variable transmission 24 (hereinafter referred to as a continuously variable transmission 24) as a continuously variable transmission mechanism coupled to the input shaft 22, a forward/reverse switching device 26 also coupled to the input shaft 22, a gear mechanism 28 as a transmission mechanism coupled through the forward/reverse switching device 26 to the input shaft 22 and disposed parallel to the continuously variable transmission 24, an output shaft 30 that is an output rotating member common to the continuously variable transmission 24 and the gear mechanism 28, a counter shaft 32, a reduction gear device 34 composed of a pair of gears meshing each other and, disposed on and non-rotatably relative to the output shaft 30 and the counter shaft 32, respectively, a differential gear 38 coupled to a gear 36 disposed relatively non-rotatably on the counter shaft 32, a pair of axles 40 coupled to the differential gear 38, etc. In the power transmission device 16 configured as described above, power of the engine 12 (synonymous with torque and force if not particularly distinguished) is transmitted sequentially through the torque converter 20, the continuously variable transmission 24 (or the forward/reverse switching device 26 and the gear mechanism 28), the reduction gear device 34, the differential gear 38, the axles 40, etc. to a pair of the drive wheels 14. An oil pump 41 is connected in a power transmittable manner to a pump impeller that is an input rotating member of the torque converter 20.

As described above, the power transmission device 16 includes the continuously variable transmission 24 and the gear mechanism 28 disposed parallel to each other in a power transmission path between the engine 12 (having the same meaning in this case as the input shaft 22 that is an input rotating member to which the power of the engine 12 is transmitted) and the drive wheels 14 (having the same meaning in this case as the output shaft 30 that is the output rotating member outputting the power of the engine 12 to the drive wheels 14). Therefore, the power transmission device 16 includes a gear running path PT1 transmitting the power of the engine 12 from the input shaft 22 through the gear mechanism 28 toward the drive wheels 14 (i.e., to the output shaft 30) and a belt running path PT2 transmitting the power of the engine 12 from the input shaft 22 through the continuously variable transmission 24 toward the drive wheels 14 (i.e., to the output shaft 30) parallel to each other, and is configured such that the gear running path PT1 and the belt running path PT2 are switched depending on a running state of the vehicle 10. Therefore, for a clutch mechanism selectively switching the gear running path PT1 and the belt running path PT2, the power transmission device 16 includes a gear running clutch C1 and a reverse brake B1 as a clutch mechanism enabling/disenabling the power transmission through the gear running path PT1, that is, connecting/disconnecting the gear running path PT1, and a belt running clutch C2 as a clutch mechanism enabling/disenabling the power transmission through the belt running path PT2, that is, connecting/disconnecting the belt running path PT2. The gear running clutch C1, the belt running clutch C2, and the reverse brake B1 correspond to a connecting/disconnecting device and are all known hydraulic friction engagement devices (friction clutches) frictionally engaged by hydraulic actuators. The gear running clutch C1 and the reverse brake B1 are each one of elements constituting the forward/reverse switching device 26 as described later.

The forward/reverse switching device 26 is disposed around the input shaft 22 coaxially with the input shaft 22 and is mainly made up of a double pinion type planetary gear device 26p, the gear running clutch C1, and the reverse brake B1. A carrier 26c of the planetary gear device 26p is integrally coupled to the input shaft 22; a ring gear 26r of the planetary gear device 26p is selectively coupled through the reverse brake B1 to the housing 18; and a sun gear 26s of the planetary gear device 26p is coupled to a small-diameter gear 42 disposed relatively rotatably around the input shaft 22 and coaxially with the input shaft 22. The carrier 26c and the sun gear 26s are selectively coupled through the gear running clutch C1. In the forward/reverse switching device 26 configured as described above, when the gear running clutch C1 is engaged and the reverse brake B1 is released, the input shaft 22 is directly coupled to the small-diameter gear 42. When the reverse brake B1 is engaged and the gear running clutch C1 is released, the small-diameter gear 42 is rotated with respect to the input shaft 22 in the opposite direction relative to when the gear running clutch C1 is engaged. When both the gear running clutch C1 and the reverse brake B1 are released, the gear running path PT1 is put into a neutral state (power transmission interrupted state) in which the power transmission is interrupted.

The gear mechanism 28 is configured to include the small-diameter gear 42 and a large-diameter gear 46 disposed relatively non-rotatably on a gear mechanism counter shaft 44 and meshed with the small-diameter gear 42. Therefore, the gear mechanism 28 is a transmission mechanism in which one gear position (gear ratio) is formed. Around the gear mechanism counter shaft 44, an idler gear 48 is disposed coaxially and relatively rotatably with respect to the gear mechanism counter shaft 44. Around the gear mechanism counter shaft 44, a dog clutch D1 selectively connecting/disconnecting the gear mechanism counter shaft 44 to/from the idler gear 48 is disposed therebetween. Therefore, the dog clutch D1 functions as a clutch mechanism included in the power transmission device 16 and enabling/disenabling the power transmission through the gear running path PT1, that is, connecting/disconnecting the gear running clutch C1 and reverse brake B1. Specifically, the dog clutch D1 includes a first gear 50 formed on the gear mechanism counter shaft 44, a second gear 52 formed on the idler gear 48, and a hub sleeve 54 provided with inner circumferential teeth that can be fitted (engaged, meshed) to the first gear 50 and the second gear 52. In the dog clutch D1 configured as described above, the hub sleeve 54 is fitted to the first gear 50 and the second gear 52 to connect the gear mechanism counter shaft 44 and the idler gear 48.

The dog clutch D1 further includes a known synchromesh mechanism S1 as a synchronizing mechanism synchronizing rotation speeds when the first gear 50 and the second gear 52 are fitted. The idler gear 48 is meshed with an output gear 56 having a diameter larger than the idler gear 48. The output gear 56 is disposed around the same rotation axis as the output shaft 30 and relatively non-rotatably with respect to the output shaft 30. When one of the gear running clutch C1 and the reverse brake B1 is engaged and the dog clutch D1 is engaged, the gear running path PT1 is established such that the power of the engine 12 is transmitted from the input shaft 22 sequentially through the forward/reverse switching device 26, the gear mechanism 28, the idler gear 48, and the output gear 56 to the output shaft 30. Therefore, when one of the gear running clutch C1 and the reverse brake B1 is engaged and the dog clutch D1 is engaged, the power of the engine 12 is transmitted to the gear running path PT1, i.e., the gear mechanism 28.

The continuously variable transmission 24 is disposed on a power transmission path between the input shaft 22 and the output shaft 30. The continuously variable transmission 24 includes a primary pulley 58 disposed on the input shaft 22 and having a variable effective diameter, a secondary pulley 62 disposed on a rotating shaft 60 coaxial with the output shaft 30 and having a variable effective diameter, and a transmission belt 64 wound between the paired variable pulleys 58, 62 and is a well-known push-type continuously variable transmission transmitting power through a frictional force between the pair of the variable pulleys 58, 62 and the transmission belt 64.

The primary pulley 58 includes a fixed sheave 58a as an input-side fixed rotating body coaxially attached to the input shaft 22, a movable sheave 58b as an input-side movable rotating body disposed relatively non-rotatably with respect to the input shaft 22 and movably in the axial direction, and a primary-side hydraulic actuator 58c (hereinafter referred to as a hydraulic actuator 58c) generating a thrust force for moving the movable sheave 58b to adjust a pulley width (V groove width) between the fixed sheave 58a and the movable sheave 58b.

The secondary pulley 62 is configured to include a fixed sheave 62a as an output-side fixed rotating body, a movable sheave 62b as an output-side movable rotating body disposed relatively non-rotatably around the axis with respect to the fixed sheave 62a and movably in the axial direction, and a secondary-side hydraulic actuator 62c (hereinafter referred to as a hydraulic actuator 62c) generating a thrust force for moving the movable sheave 62b to adjust a pulley width (V groove width) between the fixed sheave 62a and the movable sheave 62b.

The continuously variable transmission 24 has a transmission ratio (gear ratio) γ (=input shaft rotation speed Nin/output shaft rotation speed Nout) continuously changed by changing the V groove width of the pair of the variable pulleys 58, 62 to vary a winding diameter (effective diameter) of the transmission belt 64. For example, when the V groove width of the primary pulley 58 is narrowed, the gear ratio γ is reduced (i.e., the continuously variable transmission 24 is upshifted). When the V groove width of the primary pulley 58 is widened, the gear ratio γ is increased (i.e., the continuously variable transmission 24 is downshifted). The output shaft 30 is disposed around the rotating shaft 60 coaxially and relatively non-rotatably with respect to the rotating shaft 60. The belt running clutch C2 is disposed closer than the continuously variable transmission 24 to the drive wheels 14 (i.e., disposed between the secondary pulley 62 and the drive wheels 14 (the output shaft 30)) to selectively connect/disconnect the secondary pulley 62 to/from the output shaft 30 (the drive wheels 14). When this belt running clutch C2 is engaged, the belt running path PT2 is established such that the power of the engine 12 is transmitted from the input shaft 22 through the continuously variable transmission 24 to the output shaft 30. Therefore, when the belt running clutch C2 is engaged, the power of the engine 12 is transmitted to the continuously variable transmission 24.

The operation of the power transmission device 16 will hereinafter be described. FIG. 2 is a diagram for explaining switching of running patterns (modes) by using an engagement table of engagement elements of the power transmission device 16 for each of the running patterns. Each column C1 in FIG. 2 denotes the operation state of the gear running clutch C1, each column C2 in FIG. 2 denotes the operation state of the belt running clutch C2, each column B1 in FIG. 2 denotes the operation state of the reverse brake B1, each column D1 in FIG. 2 denotes the operation state of the dog clutch D1, "○" indicative of engagement (connection), and "X" indicative of release (interruption).

First, description will be made of a gear running mode that is a running pattern in which the power of the engine 12 is transmitted through the gear mechanism 28 to the output shaft 30 (i.e., a running pattern in which power is transmitted through the gear running path PT1). In this gear running mode, as shown in FIG. 2, for example, the gear running clutch C1 and the dog clutch D1 are engaged, while the belt running clutch C2 and the reverse brake B1 are released.

Specifically, when the gear running clutch C1 is engaged, the planetary gear device 26p constituting the forward/reverse switching device 26 is integrally rotated, so that the small-diameter gear 42 is rotated at the same rotation speed as the input shaft 22. Additionally, since the small-diameter gear 42 is meshed with the large-diameter gear 46 disposed on the gear mechanism counter shaft 44, the gear mechanism counter shaft 44 is also rotated together with the large-diameter gear 46. Furthermore, since the dog clutch D1 is engaged, the gear mechanism counter shaft 44 and the idler gear 48 are connected. Since the idler gear 48 is meshed with the output gear 56, the output shaft 30 disposed integrally with the output gear 56 is rotated. In this way, when the gear running clutch C1 and the dog clutch D1 are engaged, the power of the engine 12 is transmitted sequentially through the torque converter 20, the forward/reverse switching device 26, the gear mechanism 28, the idler gear 48, etc. to the output shaft 30. In this gear running mode, for example, when the reverse brake B1 and the dog clutch D1 are engaged while the belt running clutch C2 and the gear running clutch C1 are released, reverse running of the vehicle 10 is performed.

Description will be made of a belt running mode that is a running pattern in which the power of the engine 12 is transmitted through the continuously variable transmission

24 to the output shaft 30 (i.e., a running pattern in which power is transmitted through the belt running path PT2). In this belt running mode, as shown in a belt running (high vehicle speed) mode of FIG. 2, for example, the belt running clutch C2 is engaged, while the gear running clutch C1, the reverse brake B1, and the dog clutch D1 are released.

Specifically, when the belt running clutch C2 is engaged, the secondary pulley 62 and the output shaft 30 are connected, so that the secondary pulley 62 and the output shaft 30 are integrally rotated. In this way, when the belt running clutch C2 is engaged, the power of the engine 12 is transmitted sequentially through the torque converter 20, the continuously variable transmission 24, etc. to the output shaft 30. The dog clutch D1 is released during this belt running (high vehicle speed) mode so as to eliminate dragging of the gear mechanism 28 etc. during the belt running mode and prevent high rotation of the gear mechanism 28 etc. at high vehicle speed, for example.

The gear running mode is selected in a low vehicle speed region including during stop of the vehicle, for example. A gear ratio $\gamma 1$ in the gear running path PT1 (i.e., a gear ratio established by the gear mechanism 28) is set to a larger value (i.e., a gear ratio on the lower side) than the maximum gear ratio established by the continuously variable transmission 24 (i.e., the lowest gear ratio that is the gear ratio on the lowest vehicle speed side) $\gamma max$. For example, the gear ratio $\gamma 1$ corresponds to a first-speed gear ratio $\gamma 1$ that is a gear ratio of a first-speed gear position in the power transmission device 16, and the lowest gear ratio $\gamma max$ of the continuously variable transmission 24 corresponds to a second-speed gear ratio $\gamma 2$ that is a gear ratio of a second-speed gear position in the power transmission device 16. Therefore, for example, the gear running mode and the belt running mode are switched according to a shift line for switching between the first-speed gear position and the second-speed gear position in a known shift map of a multi-speed transmission. For example, in a belt running mode, a shift (e.g., belt shift, continuously variable shift) is performed such that the gear ratio $\gamma$ is changed based on a running state of the vehicle 10 such as an accelerator opening degree $\theta acc$ and a vehicle speed V by using a known method. When switching is performed from the gear running mode to the belt running (high vehicle speed) mode or from the belt running (high vehicle speed) mode to the gear running mode, as shown in FIG. 2, the switching is performed transiently through a belt running (medium vehicle speed) mode.

For example, when switching is performed from the gear running mode to the belt running (high vehicle speed) mode, switching is transiently performed from a state corresponding to the gear running mode in which the gear running clutch C1 and the dog clutch D1 are engaged, to the belt running (medium vehicle speed) mode that is a state in which the belt running clutch C2 and the dog clutch D1 are engaged. Specifically, a shift by changing operation states of the clutches (e.g., a clutch-to-clutch shift (hereinafter referred to as a C-to-C shift)) is executed such that the gear running clutch C1 is released while the gear running clutch C2 is engaged. In this case, the power transmission path is changed from the gear running path PT1 to the belt running path PT2, and the power transmission device 16 is substantially upshifted. After the power transmission path is switched, the dog clutch D1 is released to prevent unnecessary dragging and high rotation of the gear mechanism 28 (see driven input interruption of FIG. 2). In this way, the dog clutch D1 functions as a driven input interruption clutch interrupting the input from the drive wheels 14 side.

For example, if switching is performed from the belt running (high vehicle speed) mode to the gear running mode, switching is transiently performed from a state in which the belt running clutch C2 is engaged, to the belt running (medium vehicle speed) mode that is a state in which the dog clutch D1 is further engaged, for preparation of switching to the gear running mode (see downshift preparation of FIG. 2). In this belt running (medium vehicle speed) mode, rotation is also transmitted through the gear mechanism 28 to the sun gear 26$s$ of the planetary gear device 26$p$. When a shift by changing the operation state of the clutches (e.g., a C-to-C shift) is executed from the belt running (medium vehicle speed) mode such that the belt running clutch C2 is released while the gear running clutch C1 is engaged, switching to the gear running mode is achieved. In this case, the power transmission path is changed from the belt running path PT2 to the gear running path PT1, and the power transmission device 16 is substantially downshifted.

FIG. 3 is a diagram for explaining main portions of a control function and a control system for various controls in the vehicle 10. In FIG. 3, the vehicle 10 includes an electronic control device (control device) 80 including a control device of the vehicle 10 for switching the running pattern of the power transmission device 16, for example. Therefore, FIG. 3 is a diagram of an input/output system of the electronic control device 80 and is a functional block diagram for explaining the main portion of the control function by the electronic control device 80. The electronic control device 80 is configured to include, for example, a so-called microcomputer including a CPU, a RAM, a ROM, an I/O interface, etc., and the CPU executes a signal process according to a program stored in advance in the ROM, while utilizing a temporary storage function of the RAM to provide the various controls of the vehicle 10. For example, the electronic control device 80 provides an output control of the engine 12, a shift control and a belt clamping pressure control of the continuously variable transmission 24, and a switching control of switching the running pattern to the belt running mode or the gear running mode and is configured separately for the engine control, the shift control, etc., as necessary.

The electronic control device 80 is supplied with each of various actual values (e.g., an engine rotation speed Ne, an input shaft rotation speed Nin that is a rotation speed of the primary pulley 58 corresponding to a turbine rotation speed Nt, an output shaft rotation speed Nout that is a rotation speed of the secondary pulley 62 corresponding to the vehicle speed V, an accelerator opening degree $\theta acc$ that is an operation amount of an accelerator pedal considered as an acceleration request amount of a driver, a throttle valve opening degree $\theta th$, a brake-on Bon that is a signal indicative of an operated state of a foot brake serving as a service brake, and a longitudinal acceleration G of the vehicle 10) based on detection signals from various sensors included in the vehicle 10 (e.g., an engine rotation speed sensor 82, an input shaft rotation speed sensor 84, an output shaft rotation speed sensor 86, an accelerator opening degree sensor 88, a throttle valve opening degree sensor 90, a brake switch 92, and a G sensor 94).

The electronic control device 80 outputs an engine output control command signal Se for the output control of the engine 12, a hydraulic control command signal Scvt for hydraulic control related to the shift of the continuously variable transmission 24, a hydraulic control command signal Sswt for controlling the forward/reverse switching device 26, the belt running clutch C2, and the dog clutch D1 related to the switching of the running pattern of the power transmission device 16, etc.

Specifically, signals output as the engine output control command signal Se include a throttle signal for driving a throttle actuator to control opening/closing of an electronic throttle valve, an injection signal for controlling an amount of fuel injected from a fuel injection device, an ignition timing signal for controlling the timing of ignition of the engine 12 by an ignition device, etc.

Signals output as the hydraulic control command signal Scvt to a hydraulic control circuit 96 include a command signal for driving a solenoid valve for adjusting a primary pressure Pin supplied to the hydraulic actuator 58c of the primary pulley 58, a command signal for driving an electromagnetic valve (solenoid valve) for adjusting a secondary pressure Pout supplied to the hydraulic actuator 62c of the secondary pulley 62, etc.

Signals output as the hydraulic control command signal Sswt to the hydraulic control circuit 96 include command signals for driving solenoid valves controlling hydraulic pressures supplied to hydraulic actuators operating the gear running clutch C1, the reverse brake B1, the belt running clutch C2, and the hub sleeve 54.

Figure 4:
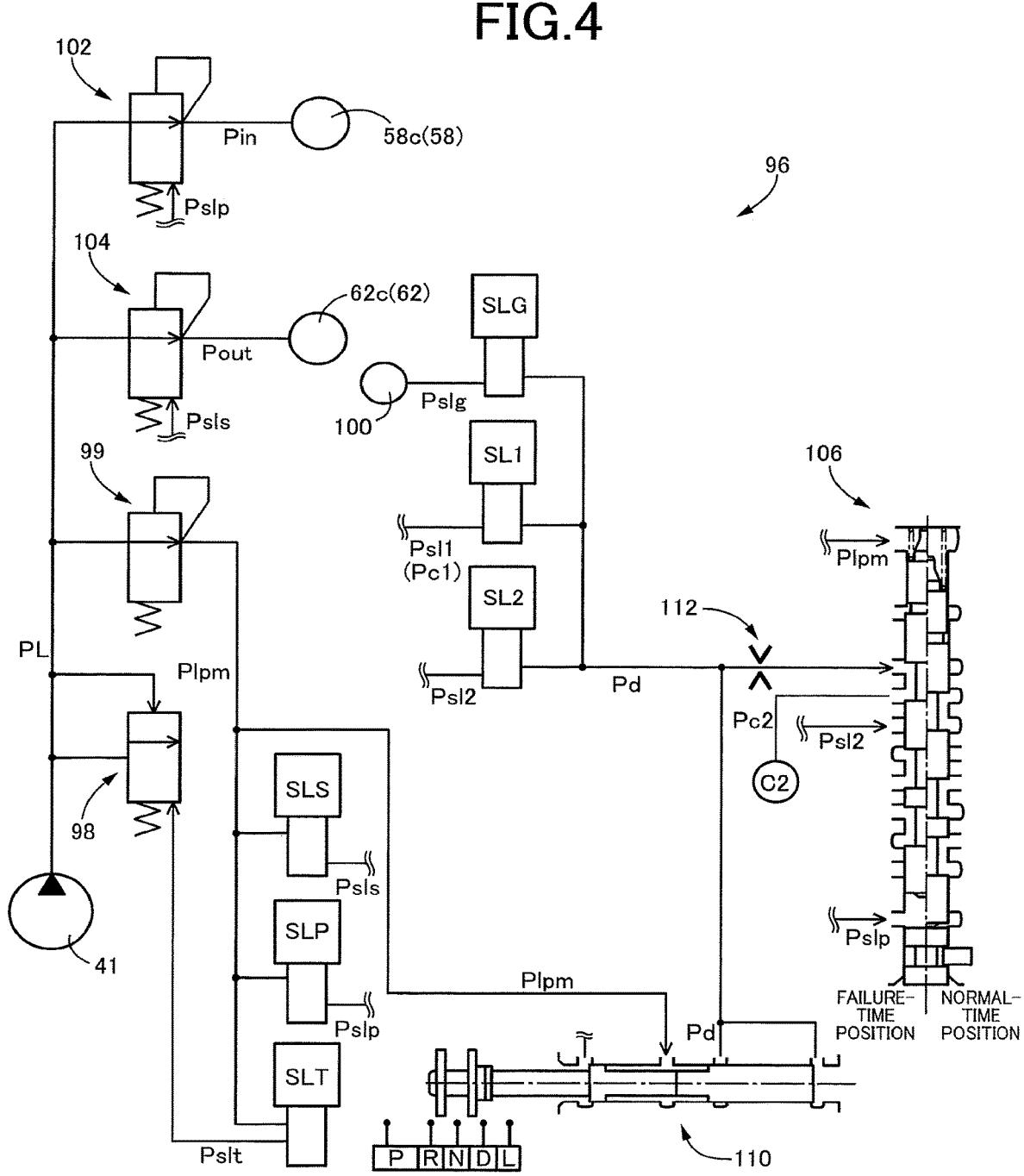
FIG. 4 is a diagram for generally explaining portions controlling a hydraulic pressure related to a continuously variable transmission, a gear running clutch, a belt running clutch, and a dog clutch, in a hydraulic control circuit included in the power transmission device of FIG. 1.

The hydraulic control circuit 96 is one of the devices constituting the power transmission device 16 and is disposed for controlling hydraulic pressures supplied to the hydraulic actuator 58c of the primary pulley 58 mainly concerned in the shift control of the continuously variable transmission 24, the hydraulic actuator 62c of the secondary pulley 62 mainly concerned in the belt clamping pressure control of the continuously variable transmission 24, and the hydraulic actuators operating the gear running clutch C1, the reverse brake B1, the belt running clutch C2, and the synchromesh mechanism S1. FIG. 4 is a diagram for explaining the hydraulic control circuit 96 included in the power transmission device 16, specifically a portion controlling the hydraulic pressure related to the continuously variable transmission 24, the gear running clutch C1, the belt running clutch C2, and the dog clutch D1.

The hydraulic control circuit 96 includes a regulator valve 98 regulating a line pressure PL by using a hydraulic fluid discharged from the oil pump 41 as a source pressure, a modulator valve 99 regulating a modulator pressure Plpm that is a constant pressure by using the line pressure PL as a source pressure, a primary pressure control valve 102 regulating a primary pressure Pin supplied to the hydraulic actuator 58c of the primary pulley 58, a secondary pressure control valve 104 regulating a secondary pressure Pout supplied to the hydraulic actuator 62c of the secondary pulley 62, a fail-safe valve 106, a primary electromagnetic valve SLP outputting an SLP pressure Pslp (control hydraulic pressure) for controlling the primary pressure Pin regulated by the primary pressure control valve 102, a secondary electromagnetic valve SLS outputting an SLS pressure Psls (control hydraulic pressure) for controlling the secondary pressure Pout regulated by the secondary pressure control valve 104, a throttle electromagnetic valve SLT outputting an SLT pressure Pslt (control hydraulic pressure) for controlling the line pressure PL regulated by the regulator valve 98, a C1 electromagnetic valve SL1 for controlling a C1 pressure Pc1 as a clutch hydraulic pressure supplied to the gear running clutch C1, a C2 electromagnetic valve SL2 for controlling a C2 pressure Pc2 as a clutch hydraulic pressure supplied to the belt running clutch C2, and a synchro electromagnetic valve SLG outputting an SLG pressure Pslg for controlling a hydraulic actuator 100 which operates the synchromesh mechanism S1. The primary electromagnetic valve SLP corresponds to an electromagnetic valve of the present invention.

The electromagnetic valves SLP, SLS, SLT, SL1, SL2, SLG are all linear solenoid valves driven by a hydraulic control command signal (supply current, drive current) output from the electronic control device 80.

The regulator valve 98 is operated based on the SLT pressure Pslt output from the throttle electromagnetic valve SLT to regulate the line pressure PL by using the hydraulic pressure of the hydraulic fluid discharged from the oil pump 41 as the source pressure. The throttle electromagnetic valve SLT outputs the SLT pressure Pslt set based on, for example, the accelerator opening degree θacc so that the line pressure PL is regulated in the regulator valve 98 according to the running state. The modulator valve 99 regulates the modulator pressure Plpm that is a constant pressure by using the line pressure PL as the source pressure.

The primary pressure control valve 102 is operated based on the SLP pressure Pslp output from the primary electromagnetic valve SLP to regulate the primary pressure Pin proportional to the SLP pressure Pslp by using the line pressure PL as the source pressure. The hydraulic actuator 58c of the primary pulley 58 is supplied with the primary pressure Pin regulated by the primary pressure control valve 102. The secondary pressure control valve 104 is operated based on the SLS pressure Psls output from the secondary electromagnetic valve SLS to regulate the secondary pressure Pout proportional to the SLS pressure Psls by using the line pressure PL as the source pressure. The hydraulic actuator 62c of the secondary pulley 62 is supplied with the secondary pressure Pout regulated by the secondary pressure control valve 104. In this example, a pressure receiving area of the hydraulic actuator 58c of the primary pulley 58 is set larger than a pressure receiving area of the hydraulic actuator 62c of the secondary pulley 62, and the maximum pressure of the primary pressure Pin is set to a value lower than the maximum pressure of the secondary pressure Pout.

The C1 electromagnetic valve SL1 outputs an SL1 pressure Psl1 by using the modulator pressure Plpm supplied through a manual valve 110 as the source pressure. This SL1 pressure Psl1 is supplied as the C1 pressure Pc1 of the gear running clutch C1. The C2 electromagnetic valve SL2 outputs an SL2 pressure Psl2 by using the modulator pressure Plpm supplied through the manual valve 110 as the source pressure. This SL2 pressure Psl2 is supplied as the C2 pressure Pc2 of the belt running clutch C2 through the fail-safe valve 106. The synchro electromagnetic valve SLG outputs the SLG pressure Pslg by using the modulator pressure Plpm supplied through the manual valve 110 as the source pressure. This SLG pressure Pslg is directly supplied as a synchro control pressure to the hydraulic actuator 100 for operating the synchromesh mechanism S1. The manual valve 110 has a communication state of an oil passage switched depending on a driver's shift operation and, for example, when a shift operation to a forward running operation position D is performed, the modulator pressure Plpm is output as a D-range pressure Pd.

Since the C1 electromagnetic valve SL1 outputs the SL1 pressure Psl1 by using the modulator pressure Plpm as the source pressure, the modulator pressure Plpm is generally a pressure higher than the SL1 pressure Psl1 and is a maximum hydraulic pressure that can be output by the C1 electromagnetic valve SL1. Since the C2 electromagnetic valve SL2 outputs the SL2 pressure Psl2 by using the modulator pressure Plpm as the source pressure, the modulator pressure Plpm is generally a pressure higher than the SL2 pressure Psl2 and is a maximum hydraulic pressure that can be output by the C2 electromagnetic valve SL2.

Figure 5:
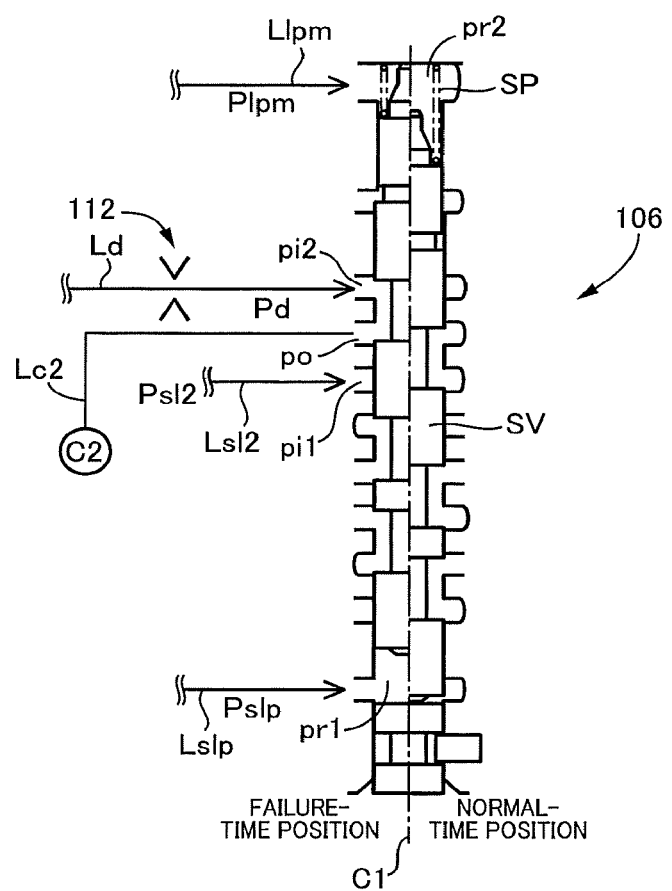
FIG. 5 is a diagram for explaining a configuration of a fail-safe valve shown in FIG. 4.

FIG. 5 is a diagram for explaining a configuration of the fail-safe valve 106 of FIG. 4. In FIG. 5, the fail-safe valve 106 is configured to have a spring SP, a first input port pi1, a second input port pi2, an output port po selectively communicating with either input port of the first input port pi1 and the second input port pi2, a first oil chamber pr1, a second oil chamber pr2, and a spool valve piece SV for switching the communication state of the first input port pi1 or the second input port pi2 with the output port po. The spool valve piece SV constituting the fail-safe valve 106 is housed slidably within a predetermined stroke in a valve body, and when the spool valve piece SV is moved to one end or the other end in a sliding direction, the output port po is allowed to communicate with the first input port pi1 or the second input port pi2.

An oil passage Lsl2 is connected to the first input port pi1 and is supplied with the SL2 pressure Psl2 (control hydraulic pressure) that is the output pressure of the C2 electromagnetic valve SL2. The C2 electromagnetic valve SL2 outputs the appropriate SL2 pressure Psl2 enabling the belt running by using the D-range pressure Pd (i.e., the modulator pressure Plpm) as the source pressure. An oil passage Ld supplied with the D-range pressure Pd is connected to the second input port pi2. When a shift operation is performed to the forward running operation position D corresponding to a forward running range (D range), the oil passage in the manual valve 110 is switched so that the modulator pressure Plpm higher than the SL2 pressure Psl2 is supplied as the D-range pressure Pd to the oil passage Ld. An orifice 112 is disposed in the oil passage Ld. The SL2 pressure Psl2 corresponds to a control hydraulic pressure of the present invention, the oil passage Lsl2 corresponds to a first oil passage supplied with the control hydraulic pressure of the present invention, and the oil passage Ld corresponds to a second oil passage supplied with a hydraulic pressure higher than the control hydraulic pressure of the present invention.

An oil passage Lc2 communicating with an oil chamber of the belt running clutch C2 is connected to the output port po. Therefore, the oil passage Lc2 serves as an oil passage for supplying the hydraulic fluid to the belt running clutch C2. An oil passage Lslp is connected to the first oil chamber pr1 and is supplied with the SLP pressure Pslp output from the primary electromagnetic valve SLP. An oil passage Llpm is connected to the second oil chamber pr2 and is supplied with the modulator pressure Plpm supplied as the source pressure of the primary electromagnetic valve SLP. The oil passage Lc2 corresponds to an oil supply passage for supplying a hydraulic fluid to a belt running clutch of the present invention, and the first oil chamber pr1 corresponds to an oil chamber of the present invention.

In the fail-safe valve 106 configured as described above, the position of the spool valve piece SV is selectively switched, based on the SLP pressure Pslp that is the output pressure of the primary electromagnetic valve SLP, between a normal-time position (on the right side relative to a center line C1 of the spool valve piece SV in FIG. 5) and a failure-time position (on the left side relative to the center line C1 of the spool valve piece SV in FIG. 5). Therefore, the fail-safe valve 106 switches a communication destination of the oil passage Lc2 for supplying the hydraulic fluid to the belt running clutch C2, to one of the oil passage Lsl2 supplied with the SL2 pressure Psl2 of the C2 electromagnetic valve SL2 and the oil passage Ld supplied with the D-range pressure Pd (i.e., the modulator pressure Plpm).

In the fail-safe valve 106, the spring SP urges the spool valve piece SV toward the normal-time position. In the fail-safe valve 106, when the modulator pressure Plpm is supplied into the second oil chamber pr2, the spool valve piece SV is urged to the not mal-time position by the modulator pressure Plpm. In the fail-safe valve 106, when the SLP pressure Pslp is supplied into the first oil chamber pr1, the spool valve piece SV is urged to the failure-time position by the SLP pressure Pslp.

For example, when the SL2 pressure Psl2 is no longer output due to disconnection of the C2 electromagnetic valve SL2 during belt running with the spool valve piece SV of the fail-safe valve 106 located at the normal-time position, a command to increase the SLS pressure Psls is output from the electronic control device 80. Subsequently, a command to increase the SLP pressure Pslp is output. When the hydraulic pressure in the first oil chamber pr1 (i.e., the SLP pressure Pslp) becomes equal to or greater than a predetermined value due to the increase in the SLP pressure Pslp, urging force generated in the first oil chamber pr1 and urging the spool valve piece SV toward the failure-time position becomes larger than urging force toward the normal-time position of the spool valve piece SV from the spring SP and the modulator pressure Plpm, and the spool valve piece SV is moved toward the failure-time position. As a result, since the fail-safe valve 106 is switched to the failure-time position and the second input port pi2 and the output port po are allowed to communicate with each other so that the oil passage Ld and the oil passage Lc2 are allowed to communicate with each other, the D-range pressure Pd (i.e., the modulator pressure Plpm) is supplied to the belt running clutch C2. Therefore, the engagement of the belt running clutch C2 is maintained, and the running (evacuation running) using the belt running is enabled.

Further, when a failure occurs in which the primary electromagnetic valve SLP constantly outputs a hydraulic pressure equal to or greater than a predetermined value (specifically, the modulator pressure Plpm that is the maximum hydraulic pressure) during gear running with the spool valve piece SV of the fail-safe valve 106 located at the normal-time position, the SLP pressure Pslp is supplied to the first oil chamber pr1, and the urging force moving the spool valve piece SV toward the failure-time position is thereby generated. In this case, the spool valve piece SV is moved to the failure-time position against the urging force moving the spool valve piece SV to the normal-time position from the spring SP and the modulator pressure Plpm. As a result, the second input port pi2 and the output port po are allowed to communicate with each other, so that the D-range pressure Pd (i.e., the modulator pressure Plpm) is supplied to the belt running clutch C2. Therefore, the belt running clutch C2 is engaged to enable the belt running, and the running (evacuation running) using the belt running is enabled.

Returning to FIG. 3, the electronic control device 80 functionally includes an engine output control means, i.e., an engine output control portion 120, a shift control means, i.e., a shift control portion 122, and a failure determining means, i.e., a failure determining portion 124.

The engine output control portion 120 calculates a required drive force Fdem based on an accelerator operation amount pap and the vehicle speed V from a relationship (e.g., a drive power map) obtained empirically or through design and stored in advance (i.e., defined in advance), sets a target engine torque Tetgt at which the required drive force Fdem is acquired, and outputs to the throttle actuators, the fuel injection device, the ignition device, etc., the respective engine output control command signals Se controlling the output of the engine 12 such that the target engine torque Tetgt is acquired.

While the vehicle 10 is stopped, the shift control portion 122 outputs a command to perform an engaging operation of the dog clutch D1 by the hydraulic actuator 100 to the hydraulic control circuit 96 in preparation for the gear running mode. Subsequently, when switching to the forward running operation position D (or a reverse running operation position R) is performed, the shift control portion 122 outputs a command to engage the gear running clutch C1 (or the reverse brake B1) to the hydraulic control circuit 96.

In the belt running mode, the shift control portion 122 applies the accelerator opening degree θacc and the vehicle speed V to, for example, a predetermined relationship (e.g., a belt shift map, a belt clamping pressure map) to determine respective hydraulic pressure commands (hydraulic control command signals Scvt) of the primary pressure Pin and the secondary pressure Pout for achieving a target transmission ratio γtgt of the continuously variable transmission 24 at which an operating point of the engine 12 is on a predetermined optimum line (e.g., an engine optimum fuel consumption line) while preventing a belt slip of the continuously variable transmission 24 from occurring, and outputs these hydraulic pressure commands to the hydraulic control circuit 96 to perform a belt shift. In this example, by adjusting the secondary pressure Pout supplied to the hydraulic actuator 62c of the secondary pulley 62, a belt clamping pressure generated between the secondary pulley 62 and the transmission belt 64 is adjusted, and the secondary pressure Pout and the belt clamping pressure increase in proportion to the SLS pressure Psls of the secondary electromagnetic valve SLS.

The shift control portion 122 provides a switching control of switching between the gear running mode and the belt running mode. Specifically, the shift control portion 122 makes a judgement on switching of the transmission ratio γ by applying the vehicle speed V and the accelerator operation amount pap to an upshift line and a downshift line having predetermined hysteresis for switching the transmission ratio γ1 in the gear running mode and the lowest transmission ratio γmax in the belt running mode, for example, and switches the running mode based on the judgment result.

When the shift control portion 122 determines to upshift during running in the gear running mode and switches the running pattern from the gear running mode to a belt running (medium vehicle speed) mode, the shift control portion 122 performs a C-to-C shift of releasing the gear running clutch C1 and engaging the belt running clutch C2. As a result, the power transmission path in the power transmission device 16 is switched from the gear running path PT1 to the belt running path PT2. When the shift control portion 122 switches the running pattern from the belt running (medium vehicle speed) mode to a belt running (high vehicle speed) mode, the shift control portion 122 outputs a command to perform a releasing operation of the dog clutch D1 by the hydraulic actuator 100 to the hydraulic control circuit 96. When the shift control portion 122 switches the running pattern from the belt running (high vehicle speed) mode to the belt running (medium vehicle speed) mode, the shift control portion 122 outputs a command to perform an engaging operation of the dog clutch D1 by the hydraulic actuator 100 to the hydraulic control circuit 96. When the shift control portion 122 determines to downshift during running in the belt running (medium vehicle speed) mode and switches the running pattern to the gear running mode, the shift control portion 122 performs a C-to-C shift of releasing the belt running clutch C2 and engaging the gear running clutch C1. As a result, the power transmission path in the power transmission device 16 is switched from the belt running path PT2 to the gear running path PT1. In the switching control of switching between the gear running mode and the belt running mode, since the switching is performed via the belt running (medium vehicle speed) mode so that the gear running path PT1 and the belt running path PT2 are switched by simply passing the torque through the C-to-C shift, a switching shock is suppressed.

During the belt running, the failure determining portion 124 determines whether a failure has occurred so that the SL2 pressure Psl2 is no longer output from the C2 electromagnetic valve SL2. For example, when a disconnection detection signal is detected from a disconnection detection circuit disposed in advance for detecting a disconnection of the C2 electromagnetic valve SL2, the failure determining portion 124 determines that the C2 electromagnetic valve SL2 has the failure. Alternatively, the failure determining portion 124 directly detects the SL2 pressure Psl2 output from the C2 electromagnetic valve SL2 with a hydraulic pressure sensor not shown and determines that the failure has occurred in the C2 electromagnetic valve SL2 when the actual pressure of the SL2 pressure Psl2 is lower by a predetermined value or more than the instruction pressure of the SL2 pressure Psl2.

During the gear running, the failure determining portion 124 determines whether a failure has occurred so that the SLP pressure Pslp is constantly output from the primary electromagnetic valve SLP. For example, when a disconnection detection signal is detected from a disconnection detection circuit disposed in advance for detecting a disconnection of the primary electromagnetic valve SLP, the failure determining portion 124 determines that the primary electromagnetic valve SLP has the failure. Since the primary electromagnetic valve SLP is of a normally open type, the modulator pressure Plpm is output from the primary electromagnetic valve SLP at the time of the failure causing the disconnection of the primary electromagnetic valve SLP.

Figure 6:
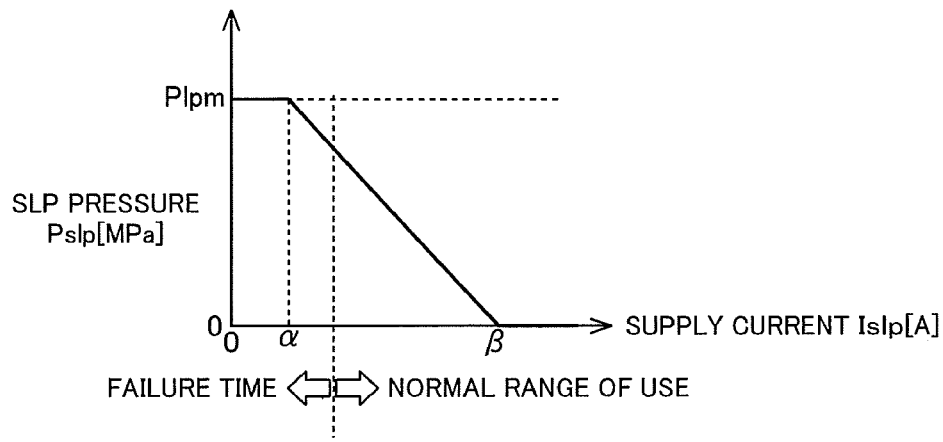
FIG. 6 is a diagram of characteristics of a primary electromagnetic valve.

The primary electromagnetic valve SLP is of the normally open type in which the SLP pressure Pslp is output when a supply current Islp to the primary electromagnetic valve SLP becomes zero and is particularly configured such that the modulator pressure Plpm is output as the maximum hydraulic pressure of the SLP pressure Pslp when the supply current Islp is zero. Specifically, the primary electromagnetic valve SLP has characteristics shown in FIG. 6. As shown in FIG. 6, when the supply current Islp supplied to the primary electromagnetic valve SLP is equal to or less than a predetermined value α, the modulator pressure Plpm is output as the maximum hydraulic pressure. The modulator pressure Plpm is the source pressure for the primary electromagnetic valve SLP and is the maximum hydraulic pressure of the SLP pressure Pslp output from the primary electromagnetic valve SLP. When the supply current Islp exceeds the predetermined value α, the SLP pressure Pslp gradually decreases, and when the supply current Islp reaches a predetermined value β, the SLP pressure Pslp becomes zero. Therefore, at the time of the failure causing the disconnection of the primary electromagnetic valve SLP, the supply current Islp supplied to the primary electromagnetic valve SLP is zero and the modulator pressure Plpm is output from the primary electromagnetic valve SLP.

Alternatively, the SLP pressure Pslp output from the primary electromagnetic valve SLP can directly be detected by a hydraulic pressure sensor not shown to determine that the primary electromagnetic valve SLP has the failure when the actual pressure of the SLP pressure Pslp is higher by a predetermined value or more than the instruction pressure of the SLP pressure Pslp.

When it is determined that the C2 electromagnetic valve SL2 has the failure during the belt running, the shift control portion 122 increases the SLS pressure Psls of the secondary electromagnetic valve SLS. In other words, the secondary pressure Pout supplied to the hydraulic actuator 62c is increased. Subsequently, the shift control portion 122 increases the SLP pressure Pslp of the primary electromagnetic valve SLP at a predetermined timing after the start of the increase of the SLS pressure Psls. In other words, the primary pressure Pin supplied to the hydraulic actuator 58c is increased. For example, when the C2 electromagnetic valve SL2 is disconnected, the SL2 pressure Psl2 becomes zero, and the C2 pressure Pc2 of the belt running clutch C2 decreases, so that a decrease in torque capacity of the belt running clutch C2 makes the belt running difficult. In this regard, since the SLP pressure Pslp is increased and the fail-safe valve 106 is thereby switched to the failure-time position, the output port po and the second input port pi2 are allowed to communicate with each other, and the belt running clutch C2 is supplied with the D-range pressure Pd, i.e., the modulator pressure Plpm. Therefore, the engagement of the belt running clutch C2 is maintained, and the belt running is enabled.

When the fail-safe valve 106 is switched to the failure-time position, the modulator pressure Plpm is supplied to the belt running clutch C2, and therefore, the belt running clutch C2 may suddenly be engaged and this may cause a belt slip of the transmission belt 64. In this regard, since the SLS pressure Psls is increased in advance, the belt clamping pressure is ensured before the belt running clutch C2 is engaged (in an engagement transition period, before the C2 pressure Pc2 of the belt running clutch C2 reaches the modulator pressure Plpm). Therefore, the belt slip is prevented during a switching transition period of the fail-safe valve 106. Furthermore, since the orifice 112 is disposed in the oil passage Ld supplied with the D-range pressure Pd (the modulator pressure Plpm), the D-range pressure Pd is dropped due to the orifice 112 and the increase in the C2 pressure Pc2 of the belt running clutch C2 is delayed. Therefore, before the belt running clutch C2 is engaged, the secondary pressure Pout can be increased to a value (target value) at which a belt slip is prevented, and the belt clamping pressure preventing the belt slip is ensured, before the belt running clutch C2 is engaged, so that the belt slip can be prevented.

When it is determined that a failure has occurred so that the SLP pressure Pslp (the modulator pressure Plpm) is constantly output from the primary electromagnetic valve SLP during the gear running, the shift control portion 122 switches the power transmission path from the gear running path PT1 to the belt running path PT2 and enables the evacuation running based on the belt running. When it is determined that the primary electromagnetic valve SLP has the failure, the shift control portion 122 releases the gear running clutch C1 or the dog clutch D1 so as to interrupt the gear running path PT1.

When the failure of the primary electromagnetic valve SLP has occurred, the SLP pressure Pslp of the primary electromagnetic valve SLP is supplied to the first oil chamber Pr1, and therefore, the spool valve piece SV of the fail-safe valve 106 is moved to the failure-time position. In this case, the oil passage Ld supplied with the D-range pressure Pd (the modulator pressure Plpm) communicates with the oil passage Lc2 for supplying the hydraulic fluid to the oil chamber of the belt running clutch C2, and the belt running clutch C2 is supplied with the D-range pressure Pd so that the belt running clutch C2 is engaged. Therefore, the belt running path PT2 is in a power transmittable state, and the evacuation running based on the belt running is enabled. Since the modulator pressure Plpm is output when the primary electromagnetic valve SLP has the failure, the primary pressure Pin is supplied through the primary pressure control valve 102 to the hydraulic actuator 58c of the primary pulley 58, and the continuously variable transmission 24 is shifted to a predetermined transmission ratio γ.

To prevent a belt slip of the transmission belt 64 during the transition period of switching to the belt running, the shift control portion 122 increases the SLS pressure Psls of the secondary electromagnetic valve SLS when it is determined that the primary electromagnetic valve SLP has the failure. As a result, the secondary pressure Pout supplied to the hydraulic actuator 62c of the secondary pulley 62 is increased, and the belt clamping pressure of the transmission belt 64 is ensured. When the SLS pressure Psls is increased, a target value of the secondary pressure Pout is calculated based on engine torque Te, the transmission ratio γ of the continuously variable transmission 24, etc., and is set to a value at which the belt clamping pressure preventing the belt slip of the transmission belt 64 is acquired.

When the fail-safe valve 106 is switched to the failure-time position, the belt running clutch C2 is supplied with the D-range pressure Pd, i.e., the modulator pressure Plpm. Since the modulator pressure Plpm is higher than the SL2 pressure Psl2 output from the C2 electromagnetic valve SL2 in the normal-time position, the belt running clutch C2 may suddenly be engaged before the secondary pressure Pout supplied to the hydraulic actuator 62c of the secondary pulley 62 reaches the target value at which the belt slip is prevented. In this case, since the belt clamping pressure is relatively small with respect to the torque transmitted to the belt running clutch C2, the belt slip of the transmission belt 64 may occur. To prevent the belt slip due to the sudden engagement of the belt running clutch C2, the orifice 112 is disposed in the oil passage Ld supplied with the D-range pressure Pd (the modulator pressure Plpm). Since the orifice 112 is disposed, the D-range pressure Pd is dropped due to the orifice 112 and the increase in the C2 pressure Pc2 is delayed when the fail-safe valve 106 is switched to the failure-time position. Therefore, the orifice 112 prevents the sudden engagement of the belt running clutch C2, and the secondary pressure Pout is increased to a value (target value) at which the belt slip is prevented (i.e., the belt clamping pressure preventing the belt slip is ensured) before the belt running clutch C2 is engaged, so that the belt slip can be prevented. The shape and dimensions of the orifice 112 are determined experimentally or through design in advance and are set to values at which the belt clamping pressure preventing the belt slip can be ensured before the belt running clutch C2 is engaged.

Figure 7:
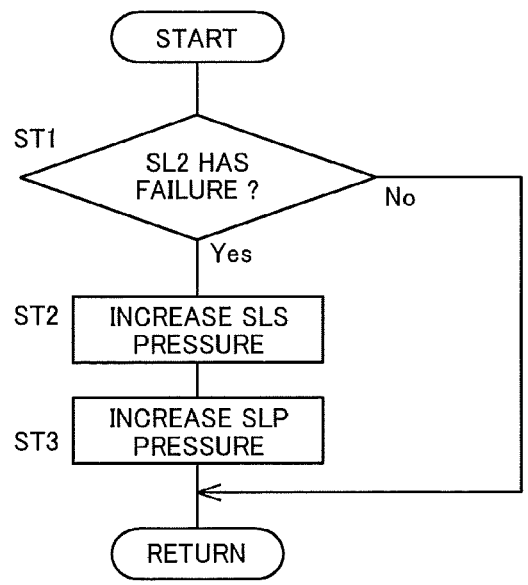
FIG. 7 is a flowchart for explaining a main portion of a control operation of an electronic control device of FIG. 3, particularly, a control operation when a C2 electromagnetic valve is disconnected during belt running.

FIG. 7 is a flowchart for explaining a main portion of the control operation of the electronic control device 80, particularly, the control operation when a failure has occurred so that the SL2 pressure Psl2 is no longer output from the C2 electromagnetic valve SL2 during the belt running. This flowchart is repeatedly executed during the belt running.

In FIG. 7, at step ST1 (hereinafter, step will be omitted) corresponding to the control function of the failure determining portion 124, it is determined whether a failure has occurred so that the SL2 pressure Psl2 is no longer output from the C2 electromagnetic valve SL2. If ST1 is negative, this routine is terminated. If it is determined that the C2 electromagnetic valve SL2 has the failure, ST1 is affirmative and the SLS pressure Psls of the secondary electromagnetic valve SLS is increased at ST2 corresponding to the control function of the shift control portion 122. Subsequently, at ST3 corresponding to the control function of the shift control portion 122, the SLP pressure Pslp of the primary electromagnetic valve SLP is increased.

In this way, when it is determined that the C2 electromagnetic valve SL2 has the failure during the belt running, since the SLS pressure Psls of the secondary electromagnetic valve SLS is increased before the SLP pressure Pslp of the primary electromagnetic valve SLP is increased, the fail-safe valve 106 is switched to the failure-time position, and the modulator pressure Plpm is supplied to the belt running clutch C2, so that the belt running is maintained. Additionally, since the hydraulic pressure supplied to the belt running clutch C2 is switched from the SL2 pressure Psl2 to the modulator pressure Plpm, the belt running clutch C2 may suddenly be engaged, and this may cause a belt slip of the transmission belt 64; however, since the SLS pressure Psls is increased (i.e., the secondary pressure Pout is increased) at a timing earlier than the time point at which the SLP pressure Pslp is increased, the belt clamping pressure is ensured in advance and the belt slip is prevented. Furthermore, since the orifice 112 is disposed in the oil passage Ld supplied with the modulator pressure Plpm, the D-range pressure Pd is dropped due to the orifice 112 and the increase in the C2 pressure Pc2 of the belt running clutch C2 is delayed, and therefore, the belt clamping pressure is ensured before the belt running clutch C2 is engaged, so that the belt slip is prevented.

Figure 8:
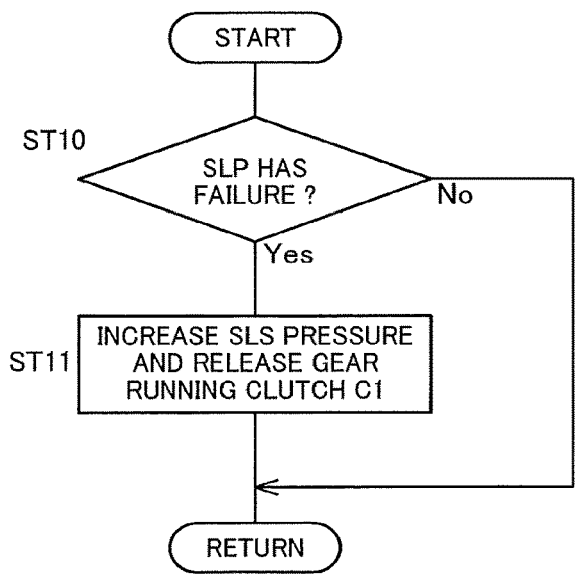
FIG. 8 is a flowchart for explaining a main portion of the control operation of the electronic control device of FIG. 3, particularly, the control operation when a failure of the primary electromagnetic valve has occurred during gear running.

FIG. 8 is a flowchart for explaining a main portion of the control operation of the electronic control device 80, particularly, the control operation when the failure of the primary electromagnetic valve SLP has occurred during the gear running. This flowchart is repeatedly executed during the gear running.

In FIG. 8, at step ST10 (hereinafter, step will be omitted) corresponding to the control function of the failure determining portion 124, it is determined whether the failure of the primary electromagnetic valve SLP has occurred. If ST10 is negative, this routine is terminated. On the other hand, if ST10 is affirmative, the SLS pressure Psls of the secondary electromagnetic valve SLS is increased to prevent a belt slip during switching to the belt running at ST11 corresponding to the control function of the shift control portion 122. Concurrently, the gear running clutch C1 is released so that the gear running path PT1 is interrupted.

In this way, when the failure of the primary electromagnetic valve SLP has occurred, the fail-safe valve 106 is switched to the failure-time position and the D-range pressure Pd (the modulator pressure Plpm) is supplied to the belt running clutch C2; however, since the orifice 112 is disposed in the oil passage Ld supplied with the D-range pressure Pd, the sudden engagement of the belt running clutch C2 is prevented, and the increase in the C2 pressure Pc2 of the belt running clutch C2 is delayed. Therefore, the SLS pressure Psls of the secondary electromagnetic valve SLS can be allowed to reach its target value in an increasing transition period of the C2 pressure Pc2. In other words, since the SLS pressure Psls of the secondary electromagnetic valve SLS reaches the target value before the belt running clutch C2 is engaged, the belt clamping pressure preventing the belt slip is ensured and the belt slip is prevented.

Figure 9:
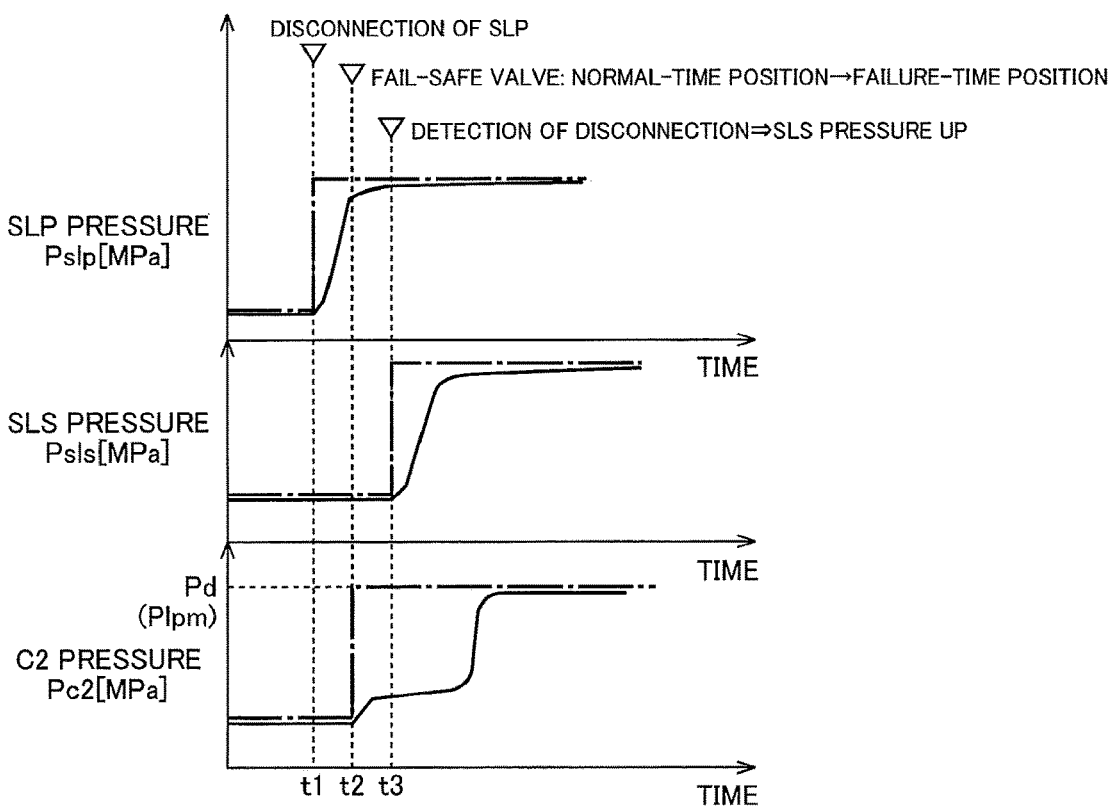
FIG. 9 is an example of a time chart of an operation result when the flowchart of FIG. 8 is executed.

FIG. 9 is an example of a time chart of an operation result when the flowchart of FIG. 8 is executed. Time t1 shown in FIG. 9 indicates the time point when a failure occurs due to disconnection of the primary electromagnetic valve SLP, time t2 indicates the time point when the fail-safe valve 106 is switched to the failure-time position due to the failure, and time t3 indicates the time point when the increase in the SLS pressure Psls of the secondary electromagnetic valve SLS is started due to detection of the disconnection of the primary electromagnetic valve SLP. Regarding the hydraulic pressures shown in FIG. 9 (the SLP pressure Pslp, the SLS pressure Psls, the C2 pressure Pc2), a dashed-dotted line indicates an instruction pressure and a solid line indicates an actual pressure.

When the failure of the primary electromagnetic valve SLP occurs at time t1, the instruction pressure of the SLP pressure Pslp is raised, resulting in an increase in the actual pressure i.e., the SLP pressure Pslp indicated by the solid line. As the SLP pressure Pslp increases, at time t2, the fail-safe valve 106 is switched from the normal-time position to the failure-time position, and the D-range pressure Pd (the modulator pressure Plpm) is supplied to the belt running clutch C2. Therefore, the C2 pressure Pc2 starts increasing at time t2. When the disconnection of the primary electromagnetic valve SLP is detected at time t3, the SLS pressure Psls of the secondary electromagnetic valve SLS starts increasing. Since the orifice 112 is disposed in the oil passage Ld supplied with the D-range pressure Pd, a stagnation period occurs in which the increase in the C2 pressure Pc2 is stagnated and the increase in the C2 pressure Pc2 is delayed, during the increasing period of the C2 pressure Pc2 of the belt running clutch C2, i.e., during filing of the hydraulic fluid into the oil chamber of the belt running clutch C2. Therefore, since the SLS pressure Psls reaches the target value before the C2 pressure Pc2 reaches the modulator pressure Plpm, the belt clamping pressure preventing the belt slip is ensured, so that the belt slip of the transmission belt 64 is prevented from occurring due to the sudden engagement of the belt running clutch C2.

As described above, according to this example, when the fail-safe valve 106 is switched to the failure-time position due to disconnection of the primary electromagnetic valve SLP, the oil passage Lc2 for supplying the hydraulic fluid to the belt running clutch C2 communicates with the oil passage Ld supplied with the D-range pressure Pd (the modulator pressure Plpm), and therefore, the D-range pressure Pd higher than the SL2 pressure Psl2 is supplied to the belt running clutch C2. Since the orifice 112 is disposed in the oil passage Ld, the increase in the C2 pressure Pc2 of the belt miming clutch C2 is delayed. Therefore, the belt clamping pressure preventing the belt slip can be ensured in the engagement transition period of the belt running clutch C2, and the belt slip can be prevented during the engagement transition period.

According to this example, since the primary electromagnetic valve SLP is of the normally open type, the SLP pressure Pslp is output when the primary electromagnetic valve SLP is disconnected. In this case, the fail-safe valve 106 is switched to the failure-time position, and the D-range pressure Pd is supplied to the belt running clutch C2; however, since the orifice 112 is disposed in the oil passage Ld supplied with the D-range pressure Pd, the increase in the C2 pressure Pc2 of the belt running clutch C2 is delayed. Therefore, the belt clamping pressure preventing the belt slip can be ensured in the engagement transition period of the belt running clutch C2, and the belt slip can be prevented during the engagement transition period.

According to this example, when the gear running clutch C1 is engaged and the belt running clutch C2 is released, the gear miming path PT1 is switched to the power transmission state so that the running using the gear running path PT1 is enabled. If disconnection of the primary electromagnetic valve SLP occurs during the running using the gear running path PT1, the fail-safe valve 106 is switched to the failure-time position, and the belt running clutch C2 is supplied with the D-range pressure Pd, so that the belt running clutch C2 is engaged. Therefore, the running (evacuation running) using the belt running path PT2 is enabled. In this case, it is required to ensure the belt clamping pressure in the continuously variable transmission 24; however, since the orifice 112 is disposed in the oil passage Ld supplied with the D-range pressure Pd, the increase in the C2 pressure Pc2 of the belt running clutch C2 is delayed, and therefore, the belt clamping pressure preventing the belt slip can be ensured in the engagement transition period of the belt running clutch C2, and the belt slip can be prevented during the engagement transition period.

Another example of the present invention will be described. In the following description, the portions common to the example described above are denoted by the same reference numerals and will not be described.

Second Example

Figure 10:
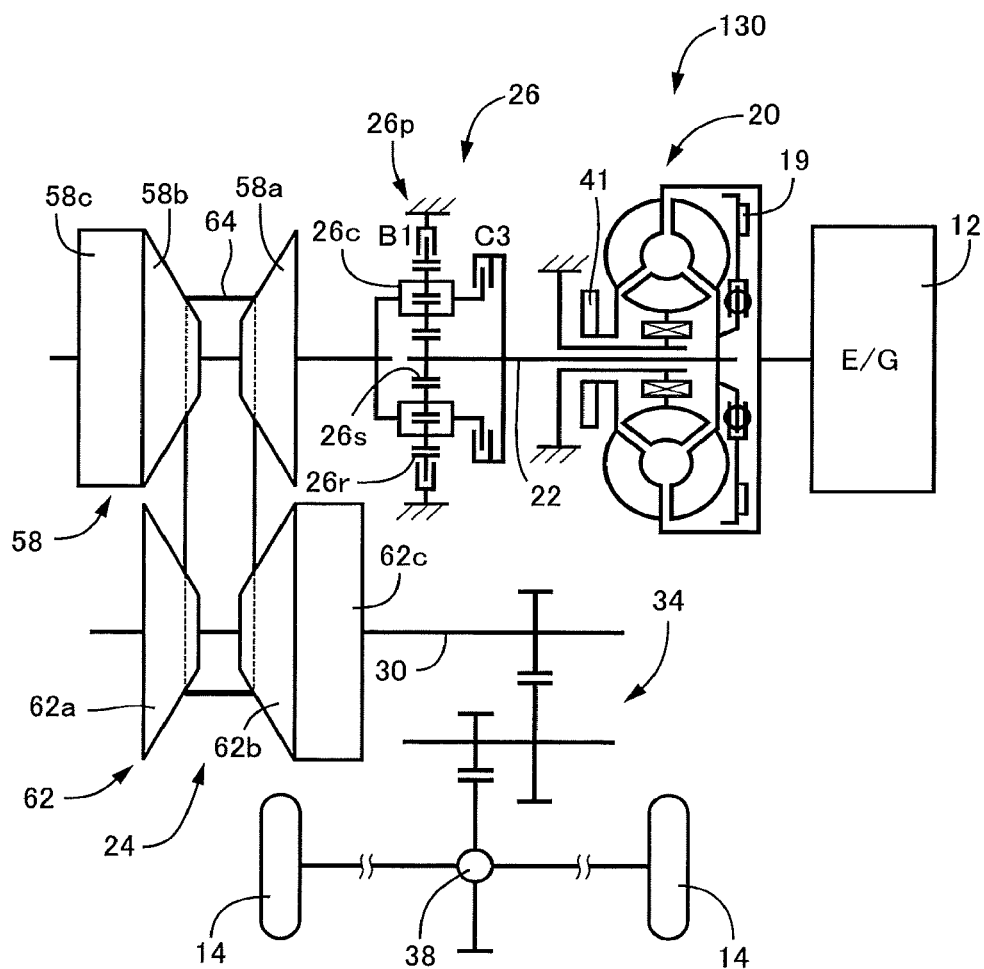
FIG. 10 is a skeleton diagram for explaining a configuration of a vehicle power transmission device according to another example of the present invention.

FIG. 10 is a skeleton diagram for explaining a configuration of a vehicle power transmission device 130 (hereinafter, the power transmission device 130) according to another example of the present invention. The power transmission device 130 of this example is configured to include the torque converter 20, the forward/reverse switching device 26, the continuously variable transmission 24, the reduction gear device 34, and the differential gear 38 between the engine 12 and the drive wheels 14. Comparing the power transmission device 130 with the power transmission device 16 of the example described above, a difference is that the gear running path configured to include the gear mechanism 28 of the above-described example is not provided. Therefore, the power transmission device 130 is a conventionally well-known power transmission device including the continuously variable transmission 24. The torque converter 20, the forward/reverse switching device 26, the continuously variable transmission 24, the reduction gear device 34, and the differential gear 38 have basically the same structures as those of the power transmission device 16 of the example described above and therefore are denoted by the same reference numerals as the example described above and will not be described.

Figure 11:
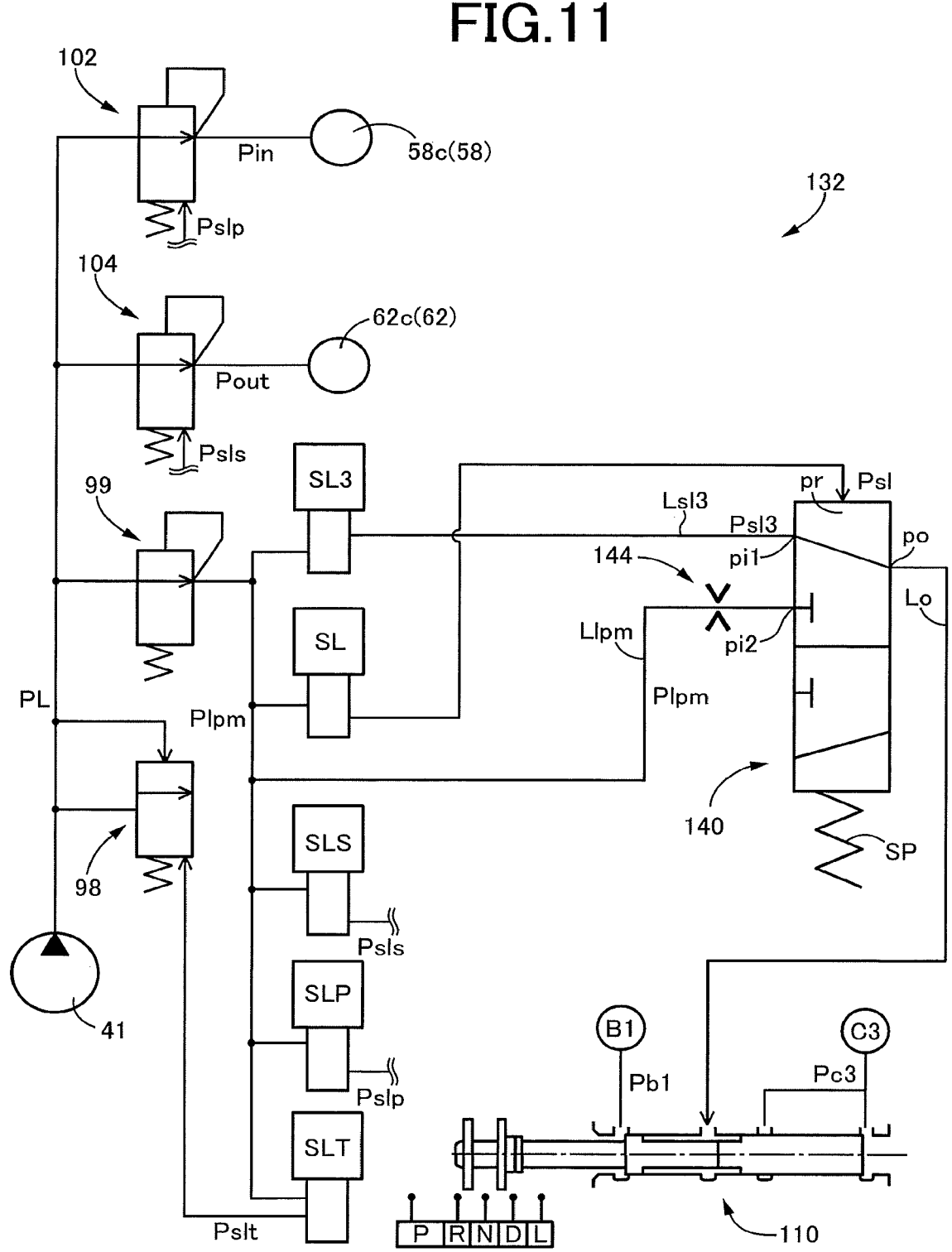
FIG. 11 is a diagram for explaining a hydraulic control circuit included in the power transmission device of FIG. 10 in terms of a portion controlling the hydraulic pressure related to the continuously variable transmission, a belt running clutch, and the reverse brake.

FIG. 11 is a diagram for explaining a hydraulic control circuit 132 included in the power transmission device 130, specifically a portion controlling the hydraulic pressure related to the continuously variable transmission 24, a belt running clutch C3, and the reverse brake B1.

In the hydraulic control circuit 132 of FIG. 11, the regulator valve 98, the modulator valve 99, the primary pressure control valve 102, the secondary pressure control valve 104, the primary electromagnetic valve SLP, the secondary electromagnetic valve SLS, the throttle electromagnetic valve SLT, and the manual valve 110 are basically the same as those of the hydraulic control circuit 96 of the example described above and therefore are denoted by the same reference numerals and will not be described.

A switching electromagnetic valve SL outputs a switching pressure Psl by using the modulator pressure Plpm as the source pressure. A C3 electromagnetic valve SL3 outputs an SL3 pressure Psl3 by using the modulator pressure Plpm as the source pressure. The SL3 pressure Psl3 is supplied through a fail-safe valve 140 described later and the manual valve 110 to the belt running clutch C3 or the reverse brake B1. For example, when a shift operation is performed to the forward running operation position D in the manual valve 110, the SL3 pressure Psl3 is supplied through the fail-safe valve 140 and the manual valve 110 as a C3 pressure Pc3 of the belt running clutch C3. When a shift operation is performed to the reverse running operation position R in the manual valve 110, the SL3 pressure Psl3 is supplied through the fail-safe valve 140 and the manual valve 110 as a B1 pressure Pb1 of the reverse brake B1.

The fail-safe valve 140 is configured to have the spring SP, the first input port pi1, the second input port pi2, the output port po selectively communicating with one of the first input port pi1 and the second input port pi2, an oil chamber pr receiving the switching pressure Psl of the switching electromagnetic valve SL, and a spool valve piece not shown for switching the communication state of the first input port pi1 or the second input port pi2 with the output port po. The spool valve piece is disposed slidably in the fail-safe valve 140, and when the spool valve piece is moved to one end or the other end in a sliding direction, the output port po is allowed to communicate with one of the first input port pi1 and the second input port Pi2.

An oil passage Lsl3 is connected to the first input port pi1 and is supplied with the SL3 pressure Psl3 that is the output pressure of the C3 electromagnetic valve SL3. An oil passage Llpm supplied with the modulator pressure Plpm is connected to the second input port pi2. An orifice 144 is disposed in the oil passage Llpm. To the output port po, an oil passage Lo is connected for supplying the hydraulic fluid through the manual valve 110 to the belt running clutch C3 or the reverse brake B1. The oil chamber pr is supplied with the switching pressure Psl output from the switching electromagnetic valve SL. The SL3 pressure Psl3 corresponds to a control hydraulic pressure of the present invention, the oil passage Lsl3 corresponds to a first oil passage supplied with the control hydraulic pressure of the present invention, the oil passage Llpm corresponds to a second oil passage supplied with a hydraulic pressure higher than the control hydraulic pressure of the present invention, and the oil passage Lo corresponds to an oil supply passage for supplying a hydraulic fluid to a belt running clutch of the present invention.

The spring SP urges the spool valve piece toward the normal-time position. Therefore, while the switching pressure Psl is not output, the spool valve piece is moved to the normal-time position by the urging force of the spring SP. The state of the spool valve piece moved to the normal-time position corresponds to FIG. 11. Specifically, the first input port pi1 and the output port po are allowed to communicate with each other. Therefore, when the spool valve piece is located at the normal-time position, the SL3 pressure Psl3 is supplied through the fail-safe valve 140 and the manual valve 110 to the belt running clutch C3 or the reverse brake B1.

When the switching pressure Psl is output from the switching electromagnetic valve SL, the switching pressure Psl is supplied into the oil chamber pr, so that an urging force moving the spool valve piece toward the failure-time position is generated. In this case, the spool valve piece is moved to the failure-time position, and the second input port pi2 and the output port po are allowed to communicate with each other. Therefore, while the fail-safe valve 140 is located at the failure-time position, the modulator pressure Plpm is supplied through the fail-safe valve 140 and the manual valve 110 to the belt running clutch C3 or the reverse brake B1. Thus, for example, even when the C3 electromagnetic valve SL3 has a failure due to disconnection etc., since the fail-safe valve 140 is switched to the failure-time position and the modulator pressure Plpm is thereby supplied to the belt running clutch C3 or the reverse brake B1, the running (evacuation running) using the continuously variable transmission 24 is enabled.

Figure 12:
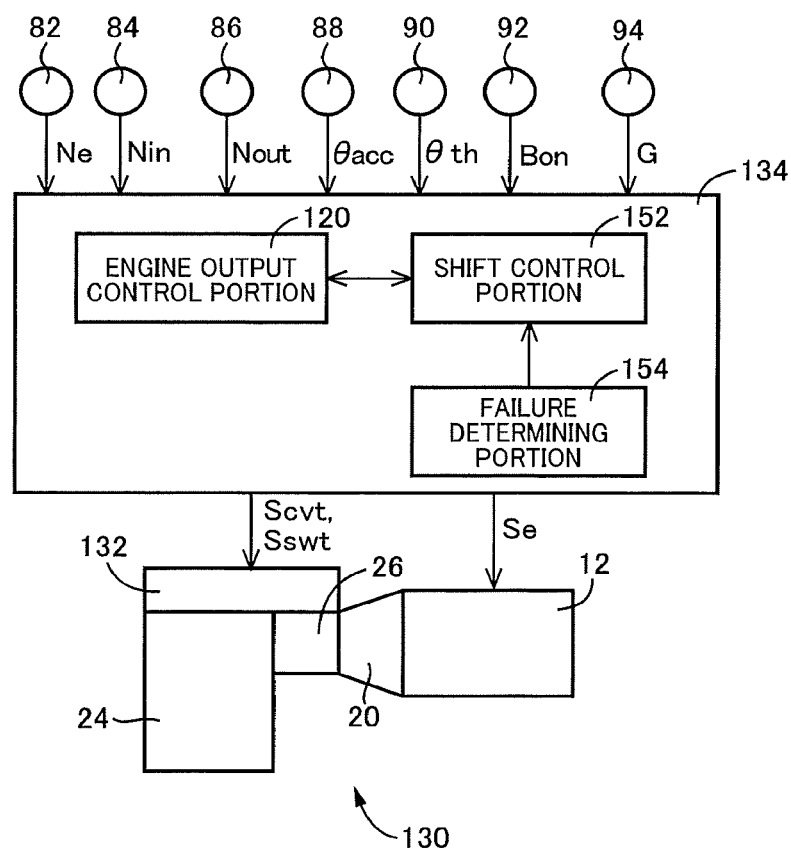
FIG. 12 is a functional block diagram for explaining a main portion of a control function of an electronic control device controlling the power transmission device of FIG. 10.

FIG. 12 is a functional block diagram for explaining a main portion of a control function of an electronic control device 134 (control device) controlling the power transmission device 130. The engine output control portion 120 shown in FIG. 12 is the same as the example described above and therefore is denoted by the same reference numeral and will not be described. A shift control portion 152 applies the accelerator opening degree θacc and the vehicle speed V to, for example, a predetermined relationship (e.g., a belt shift map, a belt clamping pressure map) to determine respective hydraulic pressure commands (the hydraulic control command signals Scvt) of the primary pressure Pin and the secondary pressure Pout for achieving the target transmission ratio γtgt of the continuously variable transmission 24 at which the operating point of the engine 12 is on a predetermined optimum line (e.g., the engine optimum fuel consumption line) while preventing a belt slip of the continuously variable transmission 24 from occurring, and outputs these hydraulic pressure commands to the hydraulic control circuit 132 to perform a belt shift.

A failure determining portion 154 determines whether a failure has occurred so that the SL3 pressure Psl3 is no longer output from the C3 electromagnetic valve SL3. For example, when a disconnection detection signal is output from a disconnection detection circuit disposed in advance for detecting a disconnection of the C3 electromagnetic valve SL3, the failure determining portion 154 determines that the C3 electromagnetic valve SL3 has the failure. Alternatively, the failure determining portion 154 directly detects the SL3 pressure Psl3 output from the C3 electromagnetic valve SL3 with a hydraulic pressure sensor not shown and determines that the failure has occurred in the C3 electromagnetic valve SL3 when the actual pressure of the SL3 pressure Psl3 is lower by a predetermined value or more than the instruction pressure of the SL3 pressure Psl3.

The failure determining portion 154 also determines whether a failure has occurred so that the switching pressure Psl is constantly output from the switching electromagnetic valve SL. For example, when a disconnection detection signal is output from a disconnection detection circuit disposed in advance for detecting a disconnection of the switching electromagnetic valve SL, the failure determining portion 154 determines that the switching electromagnetic valve SL has the failure.

The switching electromagnetic valve SL is of the normally open type in which the switching pressure Psl is output while no supply current is supplied. Therefore, at the time of the failure causing the disconnection of the switching electromagnetic valve SL, the switching pressure Psl is output from the switching electromagnetic valve SL. In this regard, a hydraulic pressure sensor not shown detecting the switching pressure Psl. can be disposed to determine that the switching electromagnetic valve SL has the failure when the switching pressure Psl is detected despite the fact that a signal for outputting the switching pressure Psl is not output from the electronic control device 134.

When it is determined that a failure has occurred so that the SL3 pressure Psl3 is not output from the C3 electromagnetic valve SL3 during running, the shift control portion 152 increases the SLP pressure Pslp of the primary electromagnetic valve SLP and increases the SLS pressure Psls of the secondary electromagnetic valve SLS. Subsequently, the shift control portion 152 outputs the switching pressure Psl of the switching electromagnetic valve SL.

When the failure occurs in the C3 electromagnetic valve SL3 during running, the engagement of the belt running clutch C3 becomes difficult (the same applies to the reverse brake B1 although detailed description is omitted); however, when the failure is detected, the switching pressure Psl is output from the switching electromagnetic valve SL, so that the fail-safe valve 140 is switched to the failure-time position, and the modulator pressure Plpm is supplied to the oil passage Lo. Therefore, since the modulator pressure Plpm is supplied to the belt running clutch C3, the evacuation running is enabled. When the modulator pressure Plpm is supplied to the belt running clutch C3, the belt running clutch C3 may suddenly be engaged; however, the SLS pressure Psls of the secondary electromagnetic valve SLS is increased in advance (the secondary pressure Pout is increased), the belt clamping pressure preventing the belt slip is ensured, and the belt slip is prevented. Furthermore, since the orifice 144 is disposed in the oil passage Llpm supplied with the modulator pressure Plpm, the D-range pressure Pd is dropped due to the orifice 144 and the increase in the C3 pressure Pc3 of the belt running clutch C3 is delayed. Therefore, the belt clamping pressure preventing the belt slip can be ensured before the belt running clutch C3 is engaged (in the engagement transition period, or before the C3 pressure Pc3 reaches the modulator pressure Plpm).

When it is determined that the switching electromagnetic valve SL has the failure during running, the shift control portion 152 increases the SLP pressure Pslp of the primary electromagnetic valve SLP and increases the SLS pressure Psls of the secondary electromagnetic valve SLS.

If the switching electromagnetic valve SL is disconnected during running, the switching pressure Psl is output, so that the fail-safe valve 140 is switched to the failure-time position. In this case, the modulator pressure Plpm is supplied to the oil passage Lo. Therefore, since the modulator pressure Plpm is supplied to the belt running clutch C3, the evacuation running is enabled. On the other hand, when the modulator pressure Plpm is supplied to the belt running clutch C3, the belt running clutch C3 may suddenly be engaged and the belt slip may occur. For prevention thereof, when it is determined that the switching electromagnetic valve SL has the failure, the SLS pressure Psls of the secondary electromagnetic valve SLS is increased (the secondary pressure Pout is increased) to prevent the belt slip, and the belt clamping pressure increases. Furthermore, since the orifice 144 is disposed in the oil passage Llpm supplied with the modulator pressure Plpm, the sudden engagement of the belt running clutch C3 is prevented, and the increase in the C3 pressure Pc3 is delayed. Therefore, before the belt running clutch C3 is engaged, the belt clamping pressure preventing the belt slip is ensured, and the belt slip is prevented.

Figure 13:
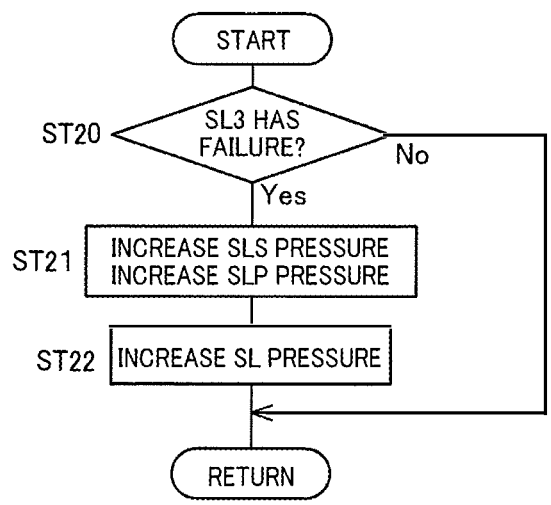
FIG. 13 is a flowchart for explaining a main portion of the control operation of the electronic control device of FIG. 12, particularly, the control operation when a C3 electromagnetic valve has a failure during running.

FIG. 13 is a flowchart for explaining a main portion of the control operation of the electronic control device 134, particularly, the control operation when a failure has occurred so that the SL3 pressure Psl3 is not output from the C3 electromagnetic valve SL3. This flowchart is repeatedly executed during operation of the vehicle 10.

In FIG. 13, at step ST20 (hereinafter, step will be omitted) corresponding to the control function of the failure determining portion 154, it is determined whether a failure has occurred so that the SL3 pressure Psl3 is not output from the C3 electromagnetic valve SL3. If ST20 is negative, this routine is terminated. If it is determined that the C3 electromagnetic valve SL3 has the failure, ST20 is affirmative and the SLS pressure Psls of the secondary electromagnetic valve SLS is increased and the SLP pressure Pslp of the primary electromagnetic valve SLP is increased at ST21 corresponding to the control function of the shift control portion 152. Subsequently, at ST22 corresponding to the control function of the shift control portion 152, the switching pressure Psl is increased.

In this way, when it is determined that the C3 electromagnetic valve SL3 has the failure, since the SLS pressure Psls of the secondary electromagnetic valve SLS is increased (the secondary pressure Pout is increased), the belt clamping pressure is ensured. Subsequently, since the switching pressure Psl is output from the switching electromagnetic valve SL so that the fail-safe valve 140 is switched to the failure-time position, the modulator pressure Plpm is supplied to the oil passage Lo so that the belt running clutch C3 can be engaged, and therefore, the evacuation running is enabled. When the modulator pressure Plpm is supplied to the belt running clutch C3, the belt running clutch C3 may suddenly be engaged; however, since the belt clamping pressure is ensured in advance, the belt slip is prevented from occurring due to the sudden engagement of the belt running clutch C3. Furthermore, since the orifice 144 is disposed in the oil passage Llpm supplied with the modulator pressure Plpm, the D-range pressure Pd is dropped due to the orifice 144, which prevents the sudden engagement of the belt running clutch C3 and delays the increase in the C3 pressure Pc3. Therefore, before the belt running clutch C3 is engaged, the required belt clamping pressure is ensured, and the belt slip is prevented.

Figure 14:
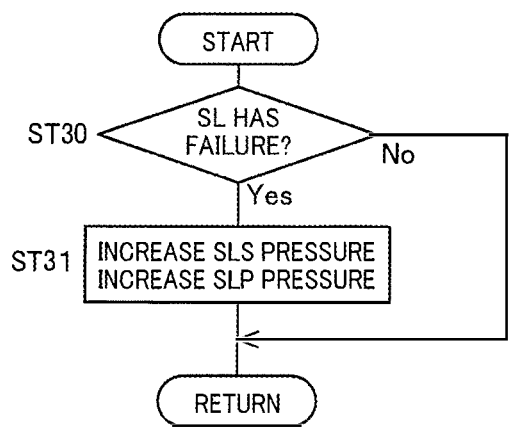
FIG. 14 is a flowchart for explaining a main portion of the control operation of the electronic control device of FIG. 12, particularly, the control operation when a failure has occurred so that a switching pressure is constantly output from a switching electromagnetic valve during running.

FIG. 14 is a flowchart for explaining a main portion of the control operation of the electronic control device 134, particularly, the control operation when a failure has occurred so that the switching pressure Psl is constantly output from the switching electromagnetic valve SL due to disconnection of the C3 electromagnetic valve SL3, for example. This flowchart is repeatedly executed during operation of the vehicle 10.

In FIG. 14, at step ST30 (hereinafter, step will be omitted) corresponding to the control function of the failure determining portion 154, it is determined whether the switching electromagnetic valve SL has the failure. If ST30 is negative, this routine is terminated. If ST30 is affirmative, i.e., it is determined that the switching electromagnetic valve SL has the failure, the SLS pressure Psls of the secondary electromagnetic valve SLS is increased and the SLP pressure Pslp of the primary electromagnetic valve SLP is increased at ST31 corresponding to the control function of the shift control portion 152.

In this way, when the failure of the switching electromagnetic valve SL has occurred, since the fail-safe valve 140 is switched to the failure-time position, the modulator pressure Plpm is supplied to the oil passage Lo and the belt running clutch C3 can be engaged, so that the evacuation running is enabled. When the fail-safe valve 140 is switched to the failure-time position and the modulator pressure Plpm is supplied to the belt running clutch C3, the belt running clutch C3 may suddenly be engaged; however, since the orifice 144 is disposed in the oil passage Llpm supplied with the modulator pressure Plpm, the D-range pressure Pd is dropped due to the orifice 144, which prevents the sudden engagement of the belt running clutch C3 and delays the increase in the C3 pressure Pc3. Therefore, before the belt running clutch C3 is engaged, the belt clamping pressure preventing the belt slip is ensured, and the belt slip can be prevented.

Figure 15:
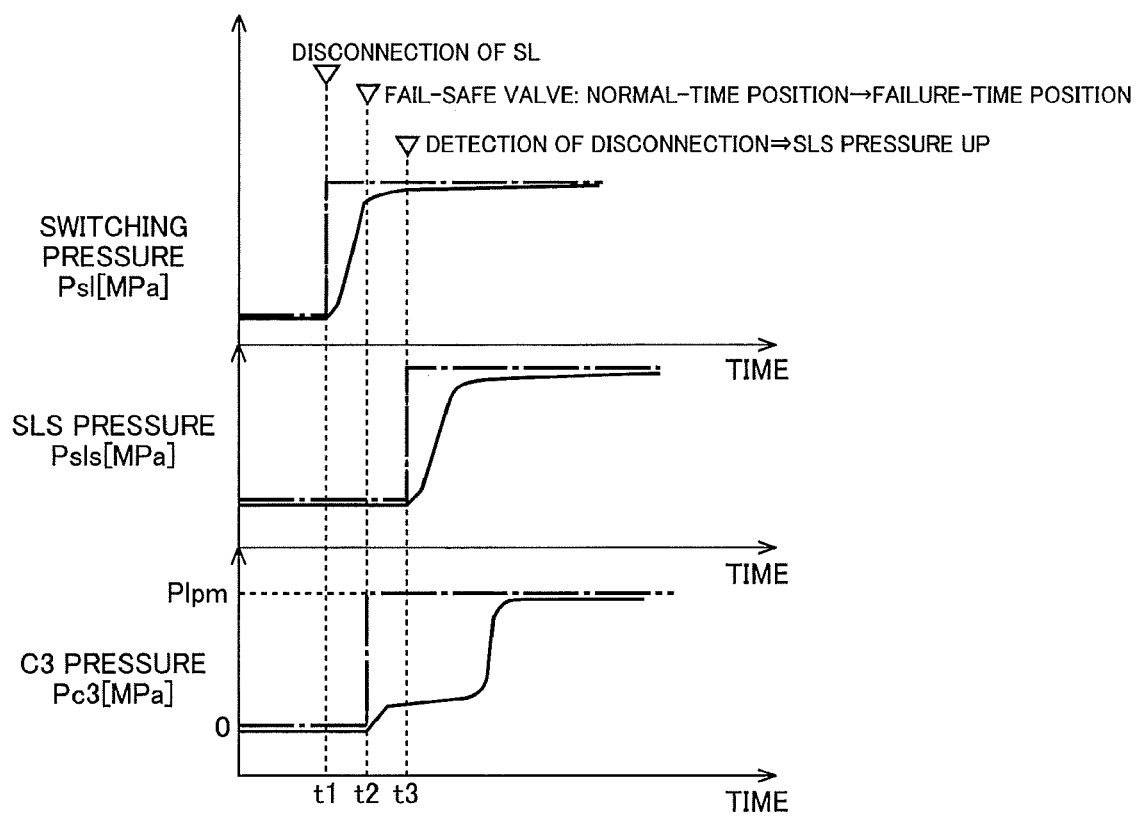
FIG. 15 is an example of a time chart of an operation result when the flowchart of FIG. 14 is executed.

FIG. 15 is a time chart of operation states at the time of disconnection of the switching electromagnetic valve SL when the power transmission device 130 is in a neutral range (N range), for example. In FIG. 15, time t1 indicates the time point when the disconnection of the switching electromagnetic valve SL results in a failure that the switching pressure Psl is output; time t2 indicates the time point when the fail-safe valve 140 is switched to the failure-time position due to the failure and a shift operation is performed, for example, to the forward running operation position D, so as to perform the evacuation running; and time t3 indicates the time point when the disconnection of the switching electromagnetic valve SL is detected so that the increase in the SLS pressure Psls of the secondary electromagnetic valve SLS is started.

At time t1, when the failure of the switching electromagnetic valve SL has occurred, the switching pressure Psl increases. As the switching pressure Psl increases, at time t2, the fail-safe valve 140 is switched from the normal-time position to the failure-time position, and the modulator pressure Plpm is supplied to the belt running clutch C3. Therefore, at time t2, the C3 pressure Pc3 supplied to the belt running clutch C3 increases. At time t3, since the disconnection of the switching electromagnetic valve SL is detected, the increase in the SLS pressure Psls of the secondary electromagnetic valve SLS is started so as to prevent the belt slip. Since the orifice 144 is disposed in the oil passage Llpm supplied with the modulator pressure Plpm, the increase in the C3 pressure Pc3 of the belt running clutch C3 temporarily stagnates, while the SLS pressure Psls of the secondary electromagnetic valve SLS reaches the vicinity of the target value. Therefore, the belt clamping pressure preventing the belt slip is ensured before the belt running clutch C3 is engaged. As described above, also in this example, since the orifice 144 is disposed in the oil passage Llpm supplied with the modulator pressure Plpm, the belt slip can be prevented as in the example described above.

Although the example of the present invention has been described in detail with reference to the drawings, the present invention is also applicable to other forms.

For example, in the examples described above, the primary pressure Pin is regulated in the primary pressure control valve 102 based on the SLP pressure Pslp output from the primary electromagnetic valve SLP and is supplied to the hydraulic actuator 58c of the primary pulley 58; however, the output pressure of the primary electromagnetic valve SLP, i.e., the SLP pressure Pslp, may directly be supplied to the hydraulic actuator 58c. Additionally, although the secondary pressure Pout is regulated by the secondary pressure control valve 104 based on the SLS pressure Psls output from the secondary electromagnetic valve SLS and is supplied to the hydraulic actuator 62c of the secondary pulley 62, the output pressure of the secondary electromagnetic valve SLS, i.e., the SLS pressure Psls, may directly be supplied to the hydraulic actuator 62c.

In the first example described above, when it is determined that a failure occurs which causes the constant output of the SLP pressure Pslp (the modulator pressure Plpm) from the primary electromagnetic valve SLP during the gear running, the shift control portion 122 releases the gear running clutch C1 or the dog clutch D1; however, the present invention is not necessarily limited to releasing one of these clutches by control, and the gear running clutch C1 or the dog clutch D1 may mechanically be released when the failure of the primary electromagnetic valve SLP has occurred. For example, the gear running clutch C1 may be configured such that the hydraulic fluid is supplied through the fail-safe valve 106 and that when the fail-safe valve 106 is switched to the failure-time position, an oil passage for supplying the hydraulic fluid to the hydraulic actuator of the gear running clutch C1 may communicate with a drain oil passage. With this configuration, when the failure of the primary electromagnetic valve SLP has occurred, the fail-safe valve 106 is switched to the failure-time position and the gear running clutch C1 is released, so that the gear running path PT1 is mechanically interrupted. The present invention is not limited to the fail-safe valve 106, and a valve other than the fail-safe valve 106 may release the gear running clutch C1 or the dog clutch D1 when the failure of the primary electromagnetic valve SLP has occurred.

Although the switching electromagnetic valve SL is configured as a normally open type in the second example described above, the valve may be configured as a normally closed type in which a hydraulic pressure proportional to a supply current is output. In this case, the fail-safe valve 140 is configured to be switched to the failure-time position by the urging force of the spring SP while the supply current of the switching electromagnetic valve SL is zero. Therefore, when the switching electromagnetic valve SL is disconnected, the fail-safe valve 140 is switched to the failure-time position so that the evacuation running is enabled.

Although the description has been mainly made in terms of the forward running of the vehicle 10 in the examples described above, the present invention is also applicable to the reverse running of the vehicle 10. For example, in the second example, even when the switching electromagnetic valve SL has a failure and the fail-safe valve 140 is switched to the failure-time position during the reverse running after the shift operation is performed to the reverse running operation position R, since the orifice 144 is disposed, the sudden engagement of the reverse brake B1 is prevented and the belt slip is prevented.

The above description is merely an embodiment and the present invention can be implemented in variously modified and improved forms based on the knowledge of those skilled in the art.

REFERENCE SIGNS LIST 16, 130: Vehicle power transmission device
24: Continuously variable transmission
28: Gear mechanism
58: Primary pulley
58c: Primary-side hydraulic actuator
62: Secondary pulley
62c: Secondary-side hydraulic actuator
64: Transmission belt
80, 134: Electronic control device (Control device)
96, 132: Hydraulic control circuit
106, 140: Fail-safe valve
112, 144: Orifice
C1: Gear running clutch
C2, C3: Belt running clutch
Lc2: Oil passage (Oil supply passage for supplying a hydraulic fluid to a belt running clutch)
Lsl2: Oil passage (First oil passage supplied with a control hydraulic pressure)
Lsl3: Oil passage (First oil passage supplied with a control hydraulic pressure)
Ld: Oil passage (Second oil passage supplied with a hydraulic pressure higher than the control hydraulic pressure)
Llpm: Oil passage (Second oil passage supplied with a hydraulic pressure higher than the control hydraulic pressure)
Lo: Oil passage (Oil supply passage for supplying a hydraulic fluid to a belt running clutch)
pr1: First oil chamber (Oil chamber)
pr: Oil chamber
SLP: Primary electromagnetic valve (Electromagnetic valve)
SL: Switching electromagnetic valve (Electromagnetic valve)

What is claimed is:

1. A vehicle power transmission device comprising:
a continuously variable transmission configured to include a primary pulley, a secondary pulley, and a transmission belt wound between the primary pulley and the secondary pulley;
a belt running clutch of hydraulic type for causing the continuously variable transmission to transmit power;
a hydraulic control circuit controlling the continuously variable transmission and the belt running clutch, the hydraulic control circuit comprising
a fail-safe valve switching a communication destination of an oil supply passage for supplying a hydraulic fluid to the belt running clutch to one of a first oil passage supplied with a control hydraulic pressure and a second oil passage supplied with a hydraulic pressure higher than the control hydraulic pressure, the fail-safe valve connecting the oil supply passage with the second oil passage when the fail-safe valve is switched to a failure position,
an electromagnetic valve which supplies an oil chamber formed in the fail-safe valve with a hydraulic pressure, the electromagnetic valve being configured to output a hydraulic pressure when a supply current becomes zero, and
a secondary-side hydraulic actuator for adjusting a belt clamping pressure generated between the secondary pulley and the transmission belt being disposed; and
an electronic control device configured to
determine if the electromagnetic valve has a failure, and
increase a hydraulic pressure of the secondary-side hydraulic actuator when it is determined that the electromagnetic valve has a failure,
wherein the second oil passage is provided with an orifice,.
wherein the fail-safe valve is switched to the failure position when a hydraulic pressure in the oil chamber reaches a predetermined value or more, and
wherein the belt running clutch is supplied with the hydraulic fluid via the second oil passage after the electronic control device increases the hydraulic pressure of the secondary- side hydraulic actuator to be greater than or equal to a target value.

2. The vehicle power transmission device according to claim 1, wherein a primary-side hydraulic actuator for adjusting a pulley width of the primary pulley is disposed, and
wherein the primary-side hydraulic actuator is supplied with an output pressure of the electromagnetic valve or a hydraulic pressure regulated based on the output pressure of the electromagnetic valve.

3. The vehicle power transmission device according to claim 1, further comprising a gear mechanism arranged parallel with the continuously variable transmission, and a gear running clutch for transmitting power to the gear mechanism.

4. The vehicle power transmission device according to claim 2, further comprising a gear mechanism arranged parallel with the continuously variable transmission, and a gear running clutch for transmitting power to the gear mechanism.

5. The vehicle power transmission device according to claim 1, wherein the electromagnetic valve is a linear solenoid valve.

6. The vehicle power transmission device according to claim 1, wherein the target value is a value at which the belt clamping pressure preventing a belt slip of the transmission belt from occurring is acquired.

* * * * *